(12) United States Patent
Miyake et al.

(10) Patent No.: US 7,333,406 B2
(45) Date of Patent: Feb. 19, 2008

(54) APPARATUS AND METHOD FOR REPRODUCING INFORMATION RECORDED ON INFORMATION STORAGE MEDIUM INCLUDING IMPROVED REPRODUCTION HALT AND RESTART CAPABILITIES, AND RECORDED PROGRAM MEDIA FOR CONTROLLING THE SAME

(75) Inventors: Tomoyuki Miyake, Nara (JP); Masanori Ushioda, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 10/535,607

(22) PCT Filed: Oct. 6, 2003

(86) PCT No.: PCT/JP03/12807

§ 371 (c)(1),
(2), (4) Date: May 19, 2005

(87) PCT Pub. No.: WO2004/049337

PCT Pub. Date: Jun. 10, 2004

(65) Prior Publication Data

US 2006/0013087 A1 Jan. 19, 2006

(30) Foreign Application Priority Data

Nov. 25, 2002 (JP) ............................. 2002-341558
May 27, 2003 (JP) ............................. 2003-149778

(51) Int. Cl.
*G11B 20/10* (2006.01)
*G11B 7/00* (2006.01)

(52) U.S. Cl. .................. 369/47.11; 369/47.32
(58) Field of Classification Search .................... None
See application file for complete search history.

(56) References Cited

U.S. PATENT DOCUMENTS 4,878,129 A   10/1989   Yasuda et al.

(Continued)

FOREIGN PATENT DOCUMENTS

JP              63-268179          11/1988

(Continued)

OTHER PUBLICATIONS

Machine translation of Higaki et al. (JP 2002-290899).*

*Primary Examiner*—William Korzuch
*Assistant Examiner*—Peter Vincent Agustin
(74) *Attorney, Agent, or Firm*—David G. Conlin; David A. Tucker; Edwards Angell Palmer & Dodge LLP

(57) ABSTRACT

When halting reproduction of an optical disc, the work memory stores identification information of the optical disc and halt position information thereof, and a contents data memory section stores information of reproduction contents. When resuming reproduction, a disc ID recognition section recognizes the identification information of the optical disc, and reads out the halt position information from the work memory, and reproduction operation is carried out from a halt position with the use of the reproduction content stored in the contents data memory section. During this, an initial process of the disc recording/reproducing section is carried out. Thereafter, reproduction from the optical disc starts uninterruptedly. This allows next reproduction of the information storage medium to start from the halt position at which the reproduction is halted. This also shortens latency time from a reproduction start instruction to actual start of the reproduction, when resuming the reproduction of the information storage medium.

38 Claims, 12 Drawing Sheets

U.S. PATENT DOCUMENTS

| | | |
|---|---|---|
| 5,191,567 A | 3/1993 | Yasuda et al. |
| 5,315,400 A * | 5/1994 | Kurata et al. ............... 386/95 |
| 5,619,483 A * | 4/1997 | Yokota et al. ........... 369/47.11 |
| 5,831,946 A | 11/1998 | De Bie |
| 5,974,219 A * | 10/1999 | Fujita et al. ............... 386/52 |
| 5,999,694 A | 12/1999 | Yasuda et al. |
| 6,157,769 A | 12/2000 | Yoshimura et al. |
| 6,388,960 B1 * | 5/2002 | Furukawa et al. ....... 369/47.11 |
| 6,393,201 B1 | 5/2002 | Sakuramoto et al. |
| 6,501,903 B1 | 12/2002 | Yoshimura et al. |
| 6,889,001 B1 | 5/2005 | Nikaido et al. |
| 7,184,376 B2 * | 2/2007 | Takeuchi .................. 369/47.11 |
| 2002/0126992 A1 | 9/2002 | Sakuramoto |
| 2002/0126993 A1 | 9/2002 | Sakuramoto et al. |
| 2002/0176695 A1 | 11/2002 | Sawabe et al. |

FOREIGN PATENT DOCUMENTS

| | | |
|---|---|---|
| JP | 2-232885 | 9/1990 |
| JP | 05-90669 | 12/1993 |
| JP | 08-124359 | 5/1996 |
| JP | 08-124364 | 5/1996 |
| JP | 8-263844 | 10/1996 |
| JP | 9-120668 | 5/1997 |
| JP | 10-188446 | 7/1998 |
| JP | 10-320891 | 12/1998 |
| JP | 2000-057751 | 2/2000 |
| JP | 2000-311420 | 11/2000 |
| JP | 2001-094906 | 4/2001 |
| JP | 2001-169250 | 6/2001 |
| JP | 2001-285760 | 10/2001 |
| JP | 2002-073043 | 3/2002 |
| JP | 2002-140858 | 5/2002 |
| JP | 2002-223411 | 8/2002 |
| JP | 2002-237169 | 8/2002 |
| JP | 2002-281447 | 9/2002 |
| JP | 2002-290899 | 10/2002 |
| KR | 1999-0067752 | 8/1999 |

* cited by examiner

| TIME CODE | T1 | T2 | T3 | T4 | T5 | T6 | T7 | T8 | T9 | ... |
|---|---|---|---|---|---|---|---|---|---|---|
| SCENE | V1 | V2 | V3 | V4 | V5 | V6 | V7 | V8 | V9 | ... |
| STORAGE LOCATION ADDRESS | DA1 | DA2 | DA3 | DA4 | DA5 | DA6 | DA7 | DA8 | DA9 | ... |

RESUME POINT

APPARATUS AND METHOD FOR REPRODUCING INFORMATION RECORDED ON INFORMATION STORAGE MEDIUM INCLUDING IMPROVED REPRODUCTION HALT AND RESTART CAPABILITIES, AND RECORDED PROGRAM MEDIA FOR CONTROLLING THE SAME

TECHNICAL FIELD

The present invention relates to a reproducing apparatus for reproducing data stored in an exchangeable information storage medium; particularly to a reproducing apparatus that can resume reproduction of the information storage medium from a reproduction halt position at which the reproduction is halted; to a reproducing apparatus arranged so that a reproduction start point can be designated in accordance with the reproduction halt position; to a reproducing method; to a reproducing program, and to a storage medium containing the reproducing program.

BACKGROUND ART

Conventionally, a recording/reproducing apparatus using an electromagnetic tape such as videotape has been pervasive as a recording/reproducing apparatus using an information storage medium for storing video information such as a television image.

Recently, as the information storage medium for storing video information such as a television image, some recording/reproducing apparatuses do not use the electromagnetic tape such as videotape, but use a disc medium that allows (i) high-quality recording and reproduction, and (ii) a large amount of storage. Examples of such a disc medium include: DVD-RAM (Digital Versatile Disc Random Access Memory), DVD-RW (DVD Minus Rewritable), and DVD+RW (DVD Plus Rewritable), and the like.

Such a disc medium has random accessibility unlike the electromagnetic tape. Specifically, even when the disc medium continuously stores video information or the like, reproduction of the disc medium can be carried out from arbitrary point(s) in an arbitrary order by using the reproducing apparatus.

Here, when the electromagnetic tape is ejected (discharged) from the electromagnetic tape reproducing apparatus, a reproduction halt point is kept as it is. Therefore, when the electromagnetic tape is reinserted (reloaded) in the reproducing apparatus, reproduction can be resumed from the halt position.

In contrast, as for the disc medium, the random accessibility makes it difficult to resume the reproduction from the-point at which the reproduction was halted last time. In order to solve such a problem, for example, Japanese Laid-Open Patent Publication No. 124359/1996 (Tokukaihei 8-124359; published on May 17, 1996) or Japanese Laid-Open Patent Publication No. 140858/2002 (Tokukai 2002-140858; published on May 17, 2002) discloses a technique about a resume function of resuming reproduction from an exact point at which the reproduction was halted.

However, with each technique in the patent publications, it is difficult to resume reproduction from the reproduction halt position of the last reproduction once the disc medium is ejected from the reproducing apparatus or the disc is exchanged.

Prior to the reproduction of such recently developed large volume optical disc with the use of the reproducing apparatus, adjustments of optical compensation have to be carried out. Examples of the optical compensation include: thickness error of a substrate, tilt of the substrate, aberration caused by the tilt, reproducing and recording laser power that is subject to outside temperature. For this reason, latency time of several ten seconds is required until an actual start of information reproduction. Such a long latency time poses inconvenience for a user.

Each of the conventional techniques in the publications is arranged such that reproduction of the optical disc can be carried out from the position at which the reproduction was halted last time. However, when especially reproducing a moving image accompanying sound from the reproduction halt position of the last reproduction, the user (viewer) possibly does not have time enough to recognize the content. In such a case, it is necessary for the user to carry out processes of pause, rewind, and the like after the start of the reproduction. Such bothersome processes are required more in the event there are a larger number of disc media that are halted, reproduced, and resumed.

The present invention is made in light of the problems, and its object is to provide: (i) a reproducing apparatus that can start next reproduction of an information storage medium from a position at which reproduction is halted; (ii) a method for controlling the reproducing apparatus; (iii) a reproduction control program; and (iv) a storage medium containing the reproduction control program.

Another object of the present invention is to shorten the latency time from an instruction of starting reproduction to actual start of the reproduction, when resuming reproduction of the information storage medium.

A further object of the present invention is to provide: (i) a display apparatus that can resume the reproduction after the user checks and sufficiently recognizes content that was reproduced before the reproduction halt; (ii) a reproducing method; (iii) a reproducing program; (iv) a storage medium storing the reproducing program.

DISCLOSURE OF INVENTION

To achieve the objects, a reproducing apparatus, of the present invention, for reproducing information stored in an information storage medium, the reproducing apparatus includes: (a) reproducing means for reproducing the information stored in the information storage medium; (b) recognition means for recognizing identification information for identifying the information storage medium; (c) memory means for storing information including the identification information; (d) reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and (e) reproduction start control means for controlling a reproduction start position in accordance with the halt position information stored in the memory means, when starting a reproduction of the information storage medium.

With this arrangement, the recognition means can recognize the identification information of the information storage medium that is being reproduced by the reproducing means or that is to be reproduced by the reproducing means.

Moreover, when halting the reproduction of the information storage medium, the reproduction halt control means causes the memory means to store the identification information of the reproduced information storage medium and the halt position information such that the identification information and the halt position information are correlated with each other. The halt position information is able to indicate the physical point from which next reproduction of the information storage medium should be started so that next reproduction of the information storage medium starts from the halt position. Moreover, when starting the reproduction of the information storage medium, the reproduction start control means controls the reproduction point in accordance with the halt position information that is stored in the memory means and that is correlated with the identification information of the information storage medium to be reproduced.

This allows reproduction of the information storage medium to be resumed from the point at which the last reproduction was halted, in the following cases (1) through (3): (1) a case where an information storage medium is not ejected from the reproducing apparatus, and is resumed; (2) a case where a first information storage medium is ejected from the reproducing apparatus, and is not exchanged with a second information storage medium, and is reinserted and resumed; and (3) a case where a first information storage medium is ejected from the reproducing apparatus, and a second information storage medium is inserted and reproduced, and the first information storage medium is reinserted and reproduced. In the cases (2) and (3), the resuming is carried out in accordance with the halt position information that corresponds to the first information storage medium and that is stored in the memory means.

As such, the above arrangement allows reproduction of the information storage medium to resume from the position where the last reproduction was halted, even in the cases where the information storage medium is ejected and reproduced again, and where the information storage medium is exchanged and reproduced again.

To achieve the object, another reproducing apparatus of the present invention includes: recognition means for recognizing identification information identifying an information storage medium; memory means for storing identification information recognized by the recognition means; reproduction halt control means for causing the memory means to store the identification information and halt position information for identifying a reproduction halt position on the information storage medium such that the identification information and the halt position information are correlated with each other, when halting a reproduction of the information storage medium; and reproduction start position control means for determining, prior to a reproduction of the information storage medium and in accordance with the halt position information, a reproduction start position at a position which comes before the reproduction halt position, and for starting a reproduction from the reproduction start position. With the above invention, the identification information of the loaded information storage medium is acquired by the recognition means, and the information storage medium is recognized (identified) and specified. Moreover, the identification information recognized by the recognition means is stored in the memory means.

When halting the reproduction of the information storage medium, the reproduction halt control means causes the memory means to store the halt position information such that the halt position information is correlated with the identification information. The halt position information indicates a point at which the reproduction of the information storage medium is halted. After that, the reproduction operation is halted.

When resuming the reproduction of the information storage medium after halting the reproduction of, e.g., a moving image contents, the reproduction start point control means sets, in accordance with the halt position information, the reproduction start point at the point before the reproduction halt position. Thereafter, the reproduction starts.

Note that the point before the halt position refers to (i) a point that corresponds to contents that has already been reproduced when the reproduction is halted (a point before the halt position in terms of time), or (ii) a point that corresponds to the contents that has already been reproduced when the reproduction is halted and that is physically away from the reproduction halt position by certain distance.

This allows reproduction of the information storage medium to resume from the point before the reproduction halt position, in the following cases (1) through (3): (1) a case where an information storage medium is not ejected from the reproducing apparatus, and is resumed; (2) a case where a first information storage medium is ejected from the reproducing apparatus, and is not exchanged with a second information storage medium, and is reinserted and resumed; and (3) a case where a first information storage medium is ejected from the reproducing apparatus, and a second information storage medium is loaded or loaded and reproduced, and the first information storage medium is reloaded and reproduced. In the cases (2) and (3), the resuming is carried out in accordance with the halt position information that corresponds to the first information storage medium.

With this, before resuming the reproduction after the reproduction halt position, the user can recall the content reproduced before the reproduction halt, and can sufficiently recognize the content. Further, with the above invention, the information storage medium that is being reproduced is correlated with the reproduction halt position. Therefore, sets of the reproduction halt position information of a plurality of the information storage media can be stored in the memory means such that the information storage media are correlated with the sets of the reproduction halt position information, respectively. That is, the reproduction halt positions of the information storage media are different, but the reproduction of each information storage medium can be resumed so that the user can recall the content of each information storage medium. With this, no bothersome processes of pause, rewind, and the like are required unlike the conventional techniques.

To achieve the objects, a method of the present invention for reproducing information stored in an information storage medium, comprising the steps of: (a) instructing reproducing means to halt a reproduction of the information storage medium; (b) storing identification information and halt position information in memory means in such a manner that the identification information and the halt position information are correlated with each other, the identification information identifying the information storage medium, the halt position information indicative of a halt position from which the reproducing means should start reproducing of the information storage medium so that next reproduction starts from the halt position; the steps (a) and (b) being carried out when halting a reproduction of the information storage medium, (c) recognizing the identification information identifying the information storage medium; (d) acquiring halt position information that corresponds to the identification information recognized in the step (c), among plural halt position information stored in the memory means; and (e) controlling, in accordance with the halt position information acquired in the step (d), a reproduction start position from which the recording means starts a reproduction, the steps (c), (d), and (e) being carried out when starting of a reproduction of the information storage medium.

With the method, when halting the reproduction of the information storage medium in response to a reproduction halt instruction, the identification information and the halt position information of the information storage medium are stored. The halt position information is used so that next reproduction starts from the halt position. With this, when resuming the reproduction, the identification information is recognized, and the stored identification information and halt position information are used, whereby the reproduction operation can be carried out from the halt position.

To achieve the object, a reproducing method of the present invention includes the steps of: (a) storing identification information and halt position information in such a manner that the identification information and the halt position information are correlated with each other, when halting reproduction of the information storage medium, the identification information identifying the information storage medium, the halt position information identifying a reproduction halt position on the information storage medium; and (b) recognizing the identification information of the information storage medium, and starting a reproduction from the reproduction start position that is determined according to the halt position information and that comes before the reproduction halt position, when starting of a reproduction of the information storage medium.

With the reproducing method, when halting the reproduction of the information storage medium, the reproduction operation is halted after storing the halt position information and the identification information such that they are correlated with each other. The halt position information indicates the reproduction halt position in the information storage medium, the identification information identifying the information storage medium.

When resuming the reproduction of the information storage medium after the reproduction halt, the identification information of the information storage medium is recognized, and the reproduction start point is determined, in accordance with the halt position information, at the point before the reproduction halt position, and the reproduction starts.

This allows reproduction of the information storage medium to resume from the point before the reproduction halt position, in the following cases (1) and (2): (1) a case where an information storage medium is not ejected from the reproducing apparatus, and is resumed; and (2) a case where a first information storage medium is ejected from the reproducing apparatus, and a second information storage medium is loaded or loaded and reproduced, and the first information storage medium is reloaded and reproduced. In the case (2), the resuming is carried out in accordance with the halt position information that corresponds to the first information storage medium.

With this, before resuming the reproduction after the reproduction halt position, the user can recall the content reproduced before the reproduction halt, and can sufficiently recognize the content.

Further, the information storage medium that is being reproduced is correlated with the reproduction halt position. Therefore, sets of the reproduction halt position information of a plurality of the information storage media can be stored in the memory means such that the, information storage media are correlated with the sets of the reproduction halt position information, respectively.

That is, irrespective of the reproduction halt positions and the information storage mediums, the reproduction of each information storage medium can be resumed so that the user can recall the content of each information storage medium. With this, no bothersome processes of pause, rewind, and the like are required unlike the conventional techniques.

To achieve the objects, a reproducing program, of the present invention, for executing the method of controlling the reproduction apparatus causes a computer to perform the steps.

With the arrangement, the control method can be executed by the computer as a reproduction program.

To achieve the objects, a computer-readable storage medium of the present invention contains the reproducing program, and has a structure allowing a computer to read.

With the arrangement, by causing a computer to read the computer-readable storage medium containing the reproduction program, the control method can be carried out.

With this, the reproduction program can be stored in the storage medium that is readable by a computer provided in the reproducing apparatus. Moreover, the storage medium allows easy storage and distribution of the reproduction program. Further, by causing the computer to read the storage medium, the computer can serve as the aforementioned means and can carry out the processes of the steps of the method for controlling the reproducing apparatus. The aforementioned means indicates: the memory content management means, the deactivating means, the deleting means, the reproduction halt control means, the reproduction start control means, the reproduction start point control means, and the reproduction control means.

Additional objects, features, and strengths of the present invention will be made clear by the description below. Further, the advantages of the present invention will be evident from the following explanation in reference to the drawings.

BEST MODE FOR CARRYING OUT THE INVENTION

Hereinafter, the present invention is explained in further detail in accordance with a plurality of embodiments; however, the present invention should not be narrowly interpreted within the limits of such embodiments.

Embodiment 1

The following description fully explains Embodiment 1 of the present invention.

Figure 1:
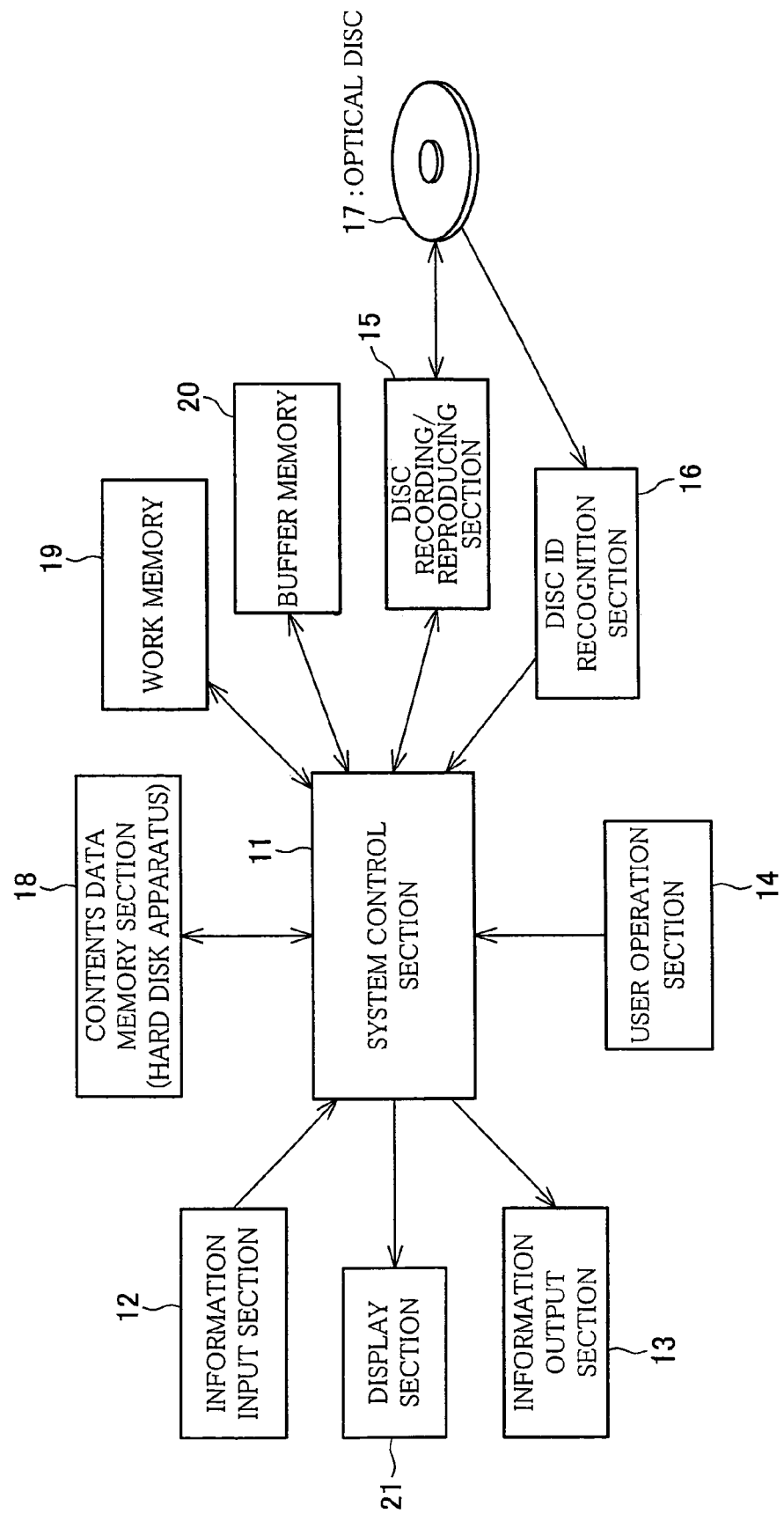
FIG. 1 is a block diagram illustrating a structure of a recording/reproducing apparatus according to an embodiment of the present invention.

FIG. 1 illustrates an example of a structure of a recording/reproducing apparatus of the present embodiment. In FIG. 1, the recording/reproducing apparatus includes: a system control section 11, an information input section 12, an information output section 13, a user operation section 14, a disc recording/reproducing section 15, a disc ID recognition section 16, a contents data memory section 18, a work memory 19, a buffer memory 20, and a display section 21. Note that, here, a recording/reproducing apparatus having a recording function is explained as one embodiment of the reproducing apparatus of the present invention; however, the reproducing apparatus of the present invention does not necessarily require the recording function. Also, an optical disc 17 used as the information storage medium is rewritable, but is not necessarily required to be rewritable.

The disc recording/reproducing section 15 receives contents data, such as image information and audio information, supplied from the information input section 12 via the system control section 11. The disc recording/reproducing section 15 can convert the received contents data into data that is recordable onto the optical disc 17, and can record the converted data onto the optical disc 17. Further, the disc recording/reproducing section 15 serves as reproducing means. In other words, the disc recording/reproducing section 15 is arranged such that: the disc recording/reproducing section 15 is capable of extracting the content data from the optical disc 17, and is capable of converting the extracted content data to data that can be reproduced by the information output section 13, and is capable of sending the converted data to the system control section 11.

Further, the disc recording/reproducing section 15 carries out an initial process in response to an instruction from the system control section 11. The initial process is carried out in the following manner. Firstly, the disc recording/reproducing section 15 makes a laser power adjustment, a disc tilt adjustment, and various adjustments of an optical head, such as aberration correction. The adjustments allows for reproducing and recording of information with respect to the optical disc 17. After that, the disc recording/reproducing section 15 reads out TOC (Table Of Contents) information from the optical disc 17, and carries out settings of parameters in accordance with the TOC information. Moreover, the disc recording/reproducing section 15 is arranged such that the disc recording/reproducing section 15 is capable of notifying, to the system control section 11, completion of the initial process when the initial process is completed.

The optical disc 17 stores (i) the contents data such as image information and audio information; (ii) the TOC information which is management information of such data and information; and the like. Some optical disc 17 includes an ID (disc ID, identification code), which is identification information of the disc. Note that the optical disc 17 include not only optical discs such as a DVD, but also a magnet-optical disc. Note also that, instead of the optical disc 17, a magnetic disc may be used. The present recording/reproducing apparatus is particularly suitable for a storage medium which requires the initial process for the reproduction of the contents data. Note that the contents data is just an example of data stored in the optical disc 17, and is not limited to the contents data.

The disc ID recognition section 16 serves as recognition means for reading out and recognizing a disc ID, when the optical disc 17 having the disc ID is inserted in the present recording/reproducing apparatus. Here, the disc ID recognition section 16 is so arranged as to acquire the disc ID from a bar code printed on a paper label (identification seal), which paper label is adhered to the optical disc 17 or a cartridge containing the optical disc 17. Namely, the user adheres the identification seal to a predetermined portion of the optical disc 17 or the cartridge so that the disc ID of optical disc 17 is recognized by the disc ID recognition section 16.

When recognizing the disc ID, the disc ID recognition section 16 transmits the information to the system control section 11. Note that the aforementioned example is not an only way of recognizing the disc ID by the disc ID recognition section 16. For example, a disc ID may be recognized from a non-contact accessible IC chip that is provided on an optical disc 17 or a cartridge and that stores the disc ID. Also, in cases where the optical disc 17 is a DVD, it is possible to use an identification code written in a recording film (surface) in a region outside recording and reproducing regions of the optical disc 17. A specific example of the region is a BCA (Burst Cutting Area) region.

The information input section 12 is so arranged as to receive contents data of television broadcasting or the like, and to supply the received contents data to the system control section 11. Moreover, the information input section 12 can include a decode function for decompressing (extending) contents data which has been compressed.

The information output section 13 has a function for reproducing the contents data sent from the system control section 11. The information output section 13 sends image information of the contents data to an image display apparatus such as a liquid crystal display apparatus or a CRT (Cathode Ray Tube), and sends audio information thereof to an audio output apparatus such as a speaker. The information output section 13 can reproduce a contents selection menu.

Here, the wording "contents selection menu" refers to index information indicating the contents of the optical disc 17. The contents selection menu includes (i) a displayed list of titles of image information etc., stored in the optical disc 17, (ii) a displayed catalogue of thumbnail images showing image composition samples, and the like. The user selects a desired menu of the contents selection menu via the user operation section 14. This allows the selected data to be notified to the system control section 11.

The user operation section 14 is provided with a reproduction key, a stop key, a search key, and the like, each of which is used for the user operation. Via the user operation section 14, a resume operation can be selected to be ON or OFF (the resume mode is selected or not). By using the user operation section 14, the user can supply various instructions to the present recording/reproducing apparatus.

The work memory 19 is an information memory apparatus for storing a disc ID management table. As is later described, the disc ID management table includes information (resume point information; halt position information) indicating a resume point (reproduction resume point), when using the resume function of the present recording/reproducing apparatus. The resume point refers to a point at which readout of the disc ID or reproduction is halted. Note that the work memory 19 is constituted by a memory which can hold information even when the power source is not supplied to the present recording/reproducing apparatus. Further, it is preferable that the work memory 19 be so arranged as to store a plurality of disc IDs of discs, a plurality of sets of resume point information of the respective discs, and the like. Here, the information in the work memory 19 can be read out by the system control section 11, and can be updated in accordance with an instruction of the system control section 11.

The buffer memory 20 is an information memory apparatus for temporarily storing the contents data of the optical disc 17. The buffer memory 20 is so arranged as to carry out data input and data output in the following manner. That is, the data writing is carried out fast and intermittently, and the data reading is carried out slowly and continuously. This allows a certain amount of data to be always accumulated in the buffer memory 20. Thus, the accumulated contents data can be used to allow for uninterrupted reproduction even when reproduction from the optical disc 17 cannot be carried out due to, e.g., de-tracking caused by externally applied vibration. In cases where the recording/reproducing apparatus is a stationary apparatus, a part of the buffer memory 20 can be used as a working memory for decompressing (extension) of digital data such as image or audio digital data, compression thereof, A/D (analog/digital) conversion thereof, D/A (digital/analog) conversion thereof, and the like.

The contents data memory section 18 includes a hard disk apparatus and the like. The contents data memory section 18 can store the contents data, and can carry out inputting/outputting of the contents data with respect to the system control section 11 in accordance with instructions of the system control section 11.

The contents data memory section 18 is so arranged as to be able to store a predetermined amount of contents data (partial contents data), which is initially required for reproduction on and after the resume point when the reproduction is resumed according to the resume function. Note that the contents data memory section 18 is so arranged as to be able to hold data even when no power source is supplied to the present recording/reproducing apparatus.

Differences between the contents data memory section 18 and the buffer memory 20 lies in that (i) the contents data memory section 18 has a larger storage capacity than the buffer memory 20 does, and (ii) the contents data memory section 18 is not used for temporarily data storage during reproduction, unlike the buffer memory 20. However, in cases where the contents data memory section 18 has such a recording/reproducing ability that a data transfer rate far exceeds a data transfer rate from the optical disc 17, the data storage section 18 can operate in a similar manner to the buffer memory 20. In the case where the contents data memory section 18 has the function of the buffer memory 20, the contents data memory section 18 stores the contents data that is pre-read from the optical disc 17. Therefore, the contents data memory section 18 can store the contents data, which is pre-read from the optical disc 17 during the halting of the reproduction, as the partial contents data.

The work memory 19 and the contents data memory section 18 constitute the memory means of the present invention. Note that the memory means of the present invention are not necessarily constituted by the work memory 19 and the contents data memory 18, i.e., the memory means may be constituted by a single memory apparatus as described above.

Note that it is preferable that the work memory 19 and the contents data memory section 18 can store resume point information and the partial contents data of a plurality of optical discs. Further, it is preferable that one or both of the work memory 19 and the contents data memory section 18 be exchangeable because it is possible to deal with, by adjusting the storage capacity, the case where a larger amount of information should be stored.

Note that referred to "resume information" is information that is required for next reproduction starting from the resume point after the reproduction of the optical disc 17 is halted. The resume information includes (i) the resume point information, (ii) storage location addresses (information about storage location; generally the TOC data) of the partial contents data in the contents data memory section 18, and (iii) the like.

Moreover, the resume information may include, for example, a date and time when a reproduction of the optical disc 17 is halted.

In this case, the information of the date and time makes it possible to identify an order in which data are stored in the contents data memory section 18 and the work memory 19. This allows the system control section 11 to have a function to delete the data, in the contents data memory section 18 and the work memory 19, from the oldest one in the order stored, in the event of running short of free storage capacity therein. In other words, the system control section 11 serves as memory content management means.

The system control section 11 can be so arranged that the disc IDs and the resume information stored in the work memory 19 are displayed by the information output section 13, which serves as display means, in response to a user's instruction supplied to the system control section 11 via the user operation section 14.

Further, the system control section 11 can be so arranged as to deactivate the reproduction from the halt position, and as to delete the resume information in the work memory 19, in accordance with the date and time, and other information. The deactivation and the deletion are carried out in response to user's instruction entered via the user operation section 14 serving as the input means. On this occasion, the system control section 11 serves as deactivating means and deleting means, respectively.

Further, a unique ID (another name) may be prepared by the user, and be so stored in the work memory 19 as to be correlated with each disc ID stored in the work memory 19. The unique ID may be prepared by entering, for example, number string via numeric keypad provided in the user operation section 14. It is more preferable that the unique ID is expressed in an alphabet, a Japanese hiragana character, or the like. In an arrangement in which the unique ID is displayed by the information output section 13, a target to be deactivated or deleted can be selected based on the unique ID, when carrying out a deactivation of the reproduction from a resume point, a deletion of resume information, or the like. This is convenient for the user because the disc ID is usually elusive and meaningless information to the user, and it is difficult for the user to identify a disc in accordance with the disc ID in cases where the ID (for example, the ID stored in the BCA) is laser-recorded onto the disc, for example. The unique ID is used for a display so that the user can confirm a target for such operations. The disc ID stored in the work memory 19 is used, by the system control section 11, for the resume operation during the reproduction of an optical disc.

In the present embodiment, the work memory 19 stores the disc ID and the resume information, and the contents data memory section 18 stores the partial contents data. However, the present invention is not limited to this. Alternatively, the contents data memory section 18 may store the disc ID, the resume information, and the partial contents data. Moreover, as described above, a part of the contents data memory section 18 can have the function of the buffer memory 20. Note that, in the present Embodiment 1, a hard disk apparatus is used as the contents data memory section 18. However, a similar effect can be obtained by using a memory apparatus storing the partial contents data in a semiconductor memory or a disc medium.

When halting the reproduction of the optical disc 17, the system control section 11 causes the contents data memory section 18 to store the partial contents data, and causes the work memory 19 to store the resume information and the information recognized by the disc ID recognition section 16 in such a manner that the resume information and the recognized information are correlated with each other. In other words, the system control section 11 serves as reproduction halt control means at the moment. When starting the reproduction of the optical disc 17, the system control section 11 serves, as reproduction start control means for controlling the reproduction by the present recording/reproducing apparatus in accordance with the partial contents data, and the resume information which corresponds to the disc ID recognized by the disc ID recognition section 16. Further, in response to the input, user's instruction entered via the user operation section 14, the system control section 11 controls the operations of the aforementioned respective blocks, and the input/output of the data between the blocks. The present recording/reproducing apparatus is so arranged that the resume mode can be switched between ON and OFF, i.e., the resume function can be activated or deactivated.

The display section 21 is constituted by, for example, a small liquid crystal display or the like, and has a function for displaying lettered information such as an operational state of the present recording/reproducing apparatus, number of track presently reproduced, elapsed time of recording or reproduction, and track mode information.

Figure 2:
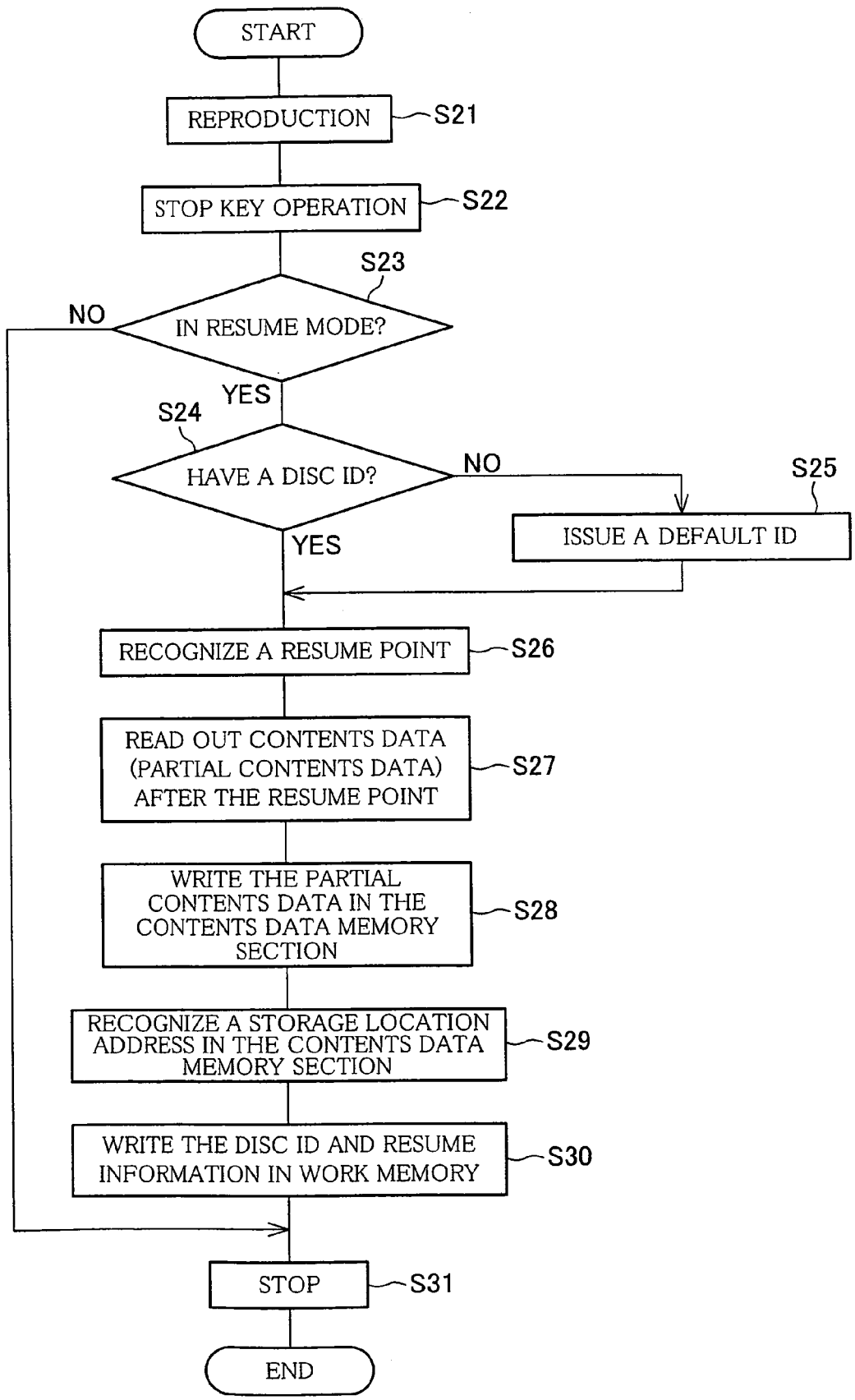
FIG. 2 is a flowchart illustrating a resume operation of the recording/reproducing apparatus shown in FIG. 1 when halting reproduction.
Figure 3:
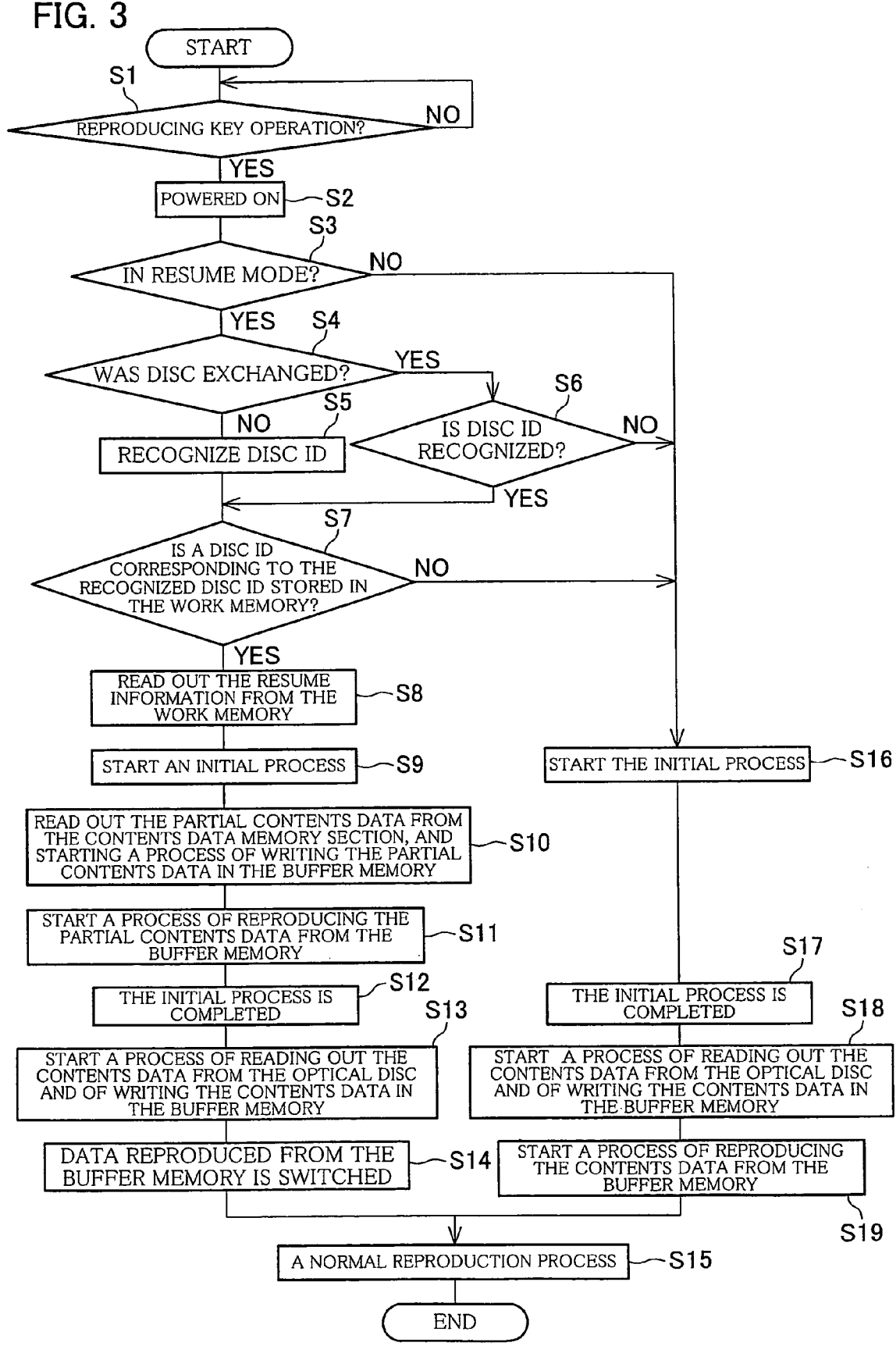
FIG. 3 is a flowchart illustrating a resume operation of the recording/reproducing apparatus upon reproduction.

The following description explains the resume operations in the present embodiment with reference to FIG. 2 and FIG. 3.

FIG. 2 is an example of a flowchart illustrating a resume operation of the present recording/reproducing apparatus during halting of a reproduction.

The flowchart illustrates a flow in which a reproduction of the optical disc 17 is halted. That is, while the present recording/reproducing apparatus is reproducing the optical disc 17 (S21), the user operates a stop key provided in the user operation section 14 (S22), thereby halting the reproduction. Note that the user can set the resume operation ON or OFF via the user operation section 14. Based on the setting, the system control section 11 judges whether or not a resume mode is set in the present recording/reproducing apparatus (S23).

In cases where it is judged that a resume mode is not set, the system control section 11 controls the disc recording/reproducing section 15 to stop the reproduction (S31).

In cases where it is judged that a resume mode is set, the system control section 11 checks whether or not the disc ID recognition section 16 has recognized the disc ID of the optical disc 17 when the optical disc 17 was loaded (S24). In cases where the disc ID has been recognized, the sequence goes to S26.

Some optical discs do not have respective disc IDs. In this case, the disc ID recognition section 16 cannot recognize each of the disc IDs. In view of the circumstances, the system control section 11 issues a default ID, as identification information, to each of the optical discs having no disc IDs, which default ID is recognizable by the disc ID recognition section 16 (S25).

When the disc ID is recognized or the default ID is issued, the system control section 11 recognizes a resume point (i.e., a reproduction halt position) by correlating with the disc ID (or by correlating with the default ID in the case where the default ID is issued; the same is true in the description below) (S26).

Next, the system control section 11 causes the disc recording/reproducing section 15 to further read out pre-read contents data of the optical disc 17. Ultimately, the disc recording/reproducing section 15 reads out necessary and sufficient amount of partial contents data from the data accumulated in the buffer memory 20, and from the contents data thus pre-read from the optical disc 17 (S27).

Note that the partial contents data is not limited to the contents data on and after a resume point, but may include the contents data before the resume point, and/or the contents data before and after the resume point. Note also that data amount of the partial contents data to be read out is not limited to specific data amount, provided that it is data amount corresponding to a period of time required for changing from a loading of the optical disc 17 to a state in which a reproduction can be made. For example, when the optical disc 17 is a rewritable DVD, the data amount may be data amount corresponding to approximately 30 seconds.

The system control section 11 causes the contents data memory section 18 to store the partial contents data thus readout(S28). The system control section 11 recognizes a storage location address, which is information indicative of a location from which the partial contents data is written (S29). The system control section 11 causes the work memory 19 to store the disc ID of the optical disc 17 and the resume information including the resume point information and the storage location address in such a manner that the disc ID and the resume information are correlated with each other (S30). Note that the information stored in the work memory 19 may include a recorded date and time, a recorded order, and the like. The unique ID of the optical disc 17 may be stored in the work memory 19. In this case, the unique ID can be entered by the user via the user operation section 14. This is especially effective to discriminate a target disc from a plurality of optical discs used by the user.

When thus finishing recording of the data required for the resume operation of the next reproduction, a normal stop operation is carried out (S31).

Note that the default ID issued in S25 refers to an ID given to an optical disc which the disc ID recognition section can not recognize. In the present recording/reproducing apparatus, even when the disc ID recognition section 16 cannot recognize a disc ID (or recognizes that there is no disc ID), a default ID is issued, and resume information is so stored as to be correlated with the default ID. On this account, a resume operation can be carried out with respect to an optical disc having no disc ID.

As to the default ID, a unique default ID (another name) may be prepared by the user, and may be stored in the work memory 19. A way of entering the unique default ID is similar to the case where the user prepares the unique ID for the disc ID stored in the work memory 19. The unique default ID is used for a display so that the user can confirm a target to be operated by the user. The default ID, which is stored in the work memory 19 and is set by the system control section 11, is used for the resume operation during reproducing of the optical disc whose disc ID is not recognized.

FIG. 3 is an example of a flowchart illustrating a resume operation during a reproduction of the recording/reproducing apparatus.

The present recording/reproducing apparatus is assumed to be powered ON in response to an operation of a reproduction key provided in the user operation section 14. Alternatively, the present recording/reproducing apparatus may be powered ON in response to a loading of the optical disc 17.

When the reproduction key is operated (S1), the system control section 11 firstly powers ON the system (S2).

Next, the system control section 11 judges whether or not a resume mode is set in the present recording/reproducing apparatus (S3). When it is judged that a resume mode is not set, the sequence goes to a normal reproduction routine (S16 through S19).

In cases where it is judged that a resume mode is set, the system control section 11 judges whether or not the optical disc 17 has been exchanged during the power OFF or the like (S4). The judgment may be carried out in accordance with, for example, detection of an open/close operation of a cover of a disc loading opening for the optical disc 17

In the case where it is judged that the optical disc 17 has not been exchanged, the disc ID recognition section 16 reads out and recognizes the disc ID from the optical disc 17 (S5).

Note that, in cases where a disc ID cannot be recognized in S5 because, for example, the optical disc 17 loaded at the moment does not have its own disc ID, a default ID is recognized.

Also in the case where it is judged that the optical disc 17 has been exchanged into another optical disc 17, the disc ID recognition section 16 reads out a disc ID of such another optical disc 17 and judges whether or not the disc ID has been successfully recognized (S6). In cases where the disc ID cannot be recognized at the moment, the sequence goes to the normal reproduction routine (S16 through S19). A reason for this is as follows. That is, in the case where it is judged that an exchanging has been made, an optical disc which was previously loaded during the halting of a reproduction or an optical disc which had been loaded, during the halting of a reproduction, earlier than the previously loaded one is not necessarily the same as an optical disc, currently loaded, whose disc ID can not be recognized.

Note that the disc ID of the optical disc 17 is recognized by the disc ID recognition section 16, and the information of the disc ID is read by the system control section 11.

Next, based on the disc ID (or default ID if the default ID is recognized in S5; the same is true in the description below) recognized by the disc ID recognition section 16, the system control section 11 searches and judges whether or not the work memory 19 has stored a disc ID corresponding to the disc ID recognized by the disc ID recognition section 16 (S7). Here, in cases where it is judged that no relevant disc ID is found in the work memory 19, the sequence goes to the normal reproduction routine (S16 through S19).

In cases where it is judged that the disc ID has been stored in the work memory 19, the system control section 11 reads out, from the work memory 19, resume point information that corresponds to the disc ID (S8).

Next, the system control section 11 instructs the disc recording/reproducing section 15 to start the initial process so that a data reproduction of the optical disc 17 is carried out from the resume point indicated by the resume point information (S9).

However, it takes a certain degree of time to actually start a reproduction of the contents data in the optical disc 17. Particularly, it generally takes several ten seconds to actually start reproducing a recordable and reproducible optical disc. This is especially true when reproducing a storage medium, such as a DVD, that has high-density and a large volume. A reason for taking time as such is because the initial process includes many adjustments such as the laser power adjustment, the disc tilt adjustment, and the aberration correction.

During the adjustments, by using the disc ID recognized in S5 or S6, the system control section 11 serving as the reproduction control means start a process of (i) reading out the partial contents data stored in the contents data memory section 18, and (ii) writing the partial contents data in the buffer memory 20 at a high-speed rate (S10).

When a certain amount of the partial contents data is written in the buffer memory 20, the system control section 11 starts a process of reproducing the partial contents data from the buffer memory 20 at a low-speed rate (S11). This allows the reproduction to start from the resume point.

During the reproducing process started in the S11 is performed, the initial process is completed, with the result that the disc recording/reproducing section 15 is ready for the reproduction from the optical disc 17 (S12). The system control section 11 controls an optical head (not shown) of the disc recording/reproducing section 15 in accordance with the resume information and the TOC information that are read out from the optical disc 17 by carrying out the initial process. Moreover, the system control section 11 carries out data search in the optical disc 17 so as to prepare for readout of data after a below-mentioned readout stop point or end point of the partial contents data written in the buffer memory 20.

The system control section 11 stops reading out the partial contents data from the contents data memory section 18 at appropriate timing. Note that all the partial contents data may be read out. The readout stop point is a point at which the readout of the partial contents data is stopped. Likewise, the end point of the partial contents data is a point at which all the partial contents data is read out. The system control section 11 reads out, from the optical disc 17, the data after the readout stop point of the partial contents data or the data after the end point thereof, and starts a writing process so that sets of the reproduction data are continuously arrayed in the buffer memory 20 (S13).

The contents data is continuously arrayed in the buffer memory 20 in a recorded order by carrying out the process of S13. The contents data thus arrayed is continuously read out from the buffer memory 20. With this, data to be reproduced is changed from (i) the partial contents data read out from the contents data memory section 18, to (ii) the contents data read out from the optical disc 17 (S14).

Thereafter, the system control section 11 reads out the contents data at a high-speed rate from the optical disc 17 via the disc recording/reproducing section 15, and accumulates the readout contents data in the buffer memory 20. Meanwhile, the contents data is continuously read out at a low-speed rate from the buffer memory 20, and is sent, as the reproduction data, to the information output section 13. In other words, the normal reproducing process is carried out (Si1). As such, the data input into the buffer memory 20 is carried out faster than the data output therefrom. On this account, coupling of the reproduction data can be realized relatively with ease.

As described above, the readout of the reproduction data is uninterruptedly switched from (i) the reproduction from the contents data memory section 18, to (ii) the reproduction from the optical disc 17. This shortens the latency time from the reproduction key operation to the actual start of the reproduction. Further, in the buffer memory 20, the reproduction data from the contents data memory section 18 is coupled with the reproduction data from the optical disc 17, so that continuous data is produced. With this, information can be obtained uninterruptedly when the operation is switched to the reproduction from the optical disc 17.

Once ejecting the optical disc 17 having no disc ID, it is impossible to guarantee the correlation between the optical disc 17 and the resume information. However, in cases where the optical disc 17 having no disc ID is not exchanged (ejected), it is possible to resume such an optical disc 17 in a similar manner that the optical disc 17 having the disc ID is resumed. What makes this possible is, for example, to issue the aforementioned default ID. The default ID may be issued to, for example, the optical disc 17 having no disc ID, and is stored as the resume information in the work memory 19 in such a manner that the default ID is correlated with the halt position information. The default ID may be a common ID to any optical disc 17 having no identifiable disc ID. This allows all the sets of the resume information to be stored with the disc IDs correlated, respectively.

Note that the user can recognize, from the start of the reproduction, which part of the contents data is reproduced by checking a track number and a track mode displayed on the display section 21 in S8. For this display operation from the start of the reproduction, it is preferable that the resume information includes an address of the resume point, and an end address of a part including the resume point.

Further, the normal reproduction routine is carried out (i) when judged, in S3, that the present recording/reproducing apparatus is not in the resume mode; (ii) when no disc ID is recognized in S6; or (iii) when no relevant disc ID is found in S7.

Specifically, the system control section 11 instructs the disc recording/reproducing section 15 to start the initial process (S16). When the completion of the initial process causes the disc recording/reproducing section 15 to be ready for recording and reproduction (S17), the system control section 11 starts a process of (i) reading out the contents data from the optical disc 17 via the disc recording/reproducing section 15, and of (ii) writing the contents data in the buffer memory 20, at a high-speed rate (S18). When a certain amount of the contents data is written in the buffer memory 20, the system control section 11 starts a process of reproducing the contents data at a low-speed rate from the buffer memory 20 (S19). With this, the data is continuously read out at a low-speed rate from the buffer memory 20, and is outputted as the reproduction data, and the sequence goes to the normal reproducing process (S15).

Figure 4:
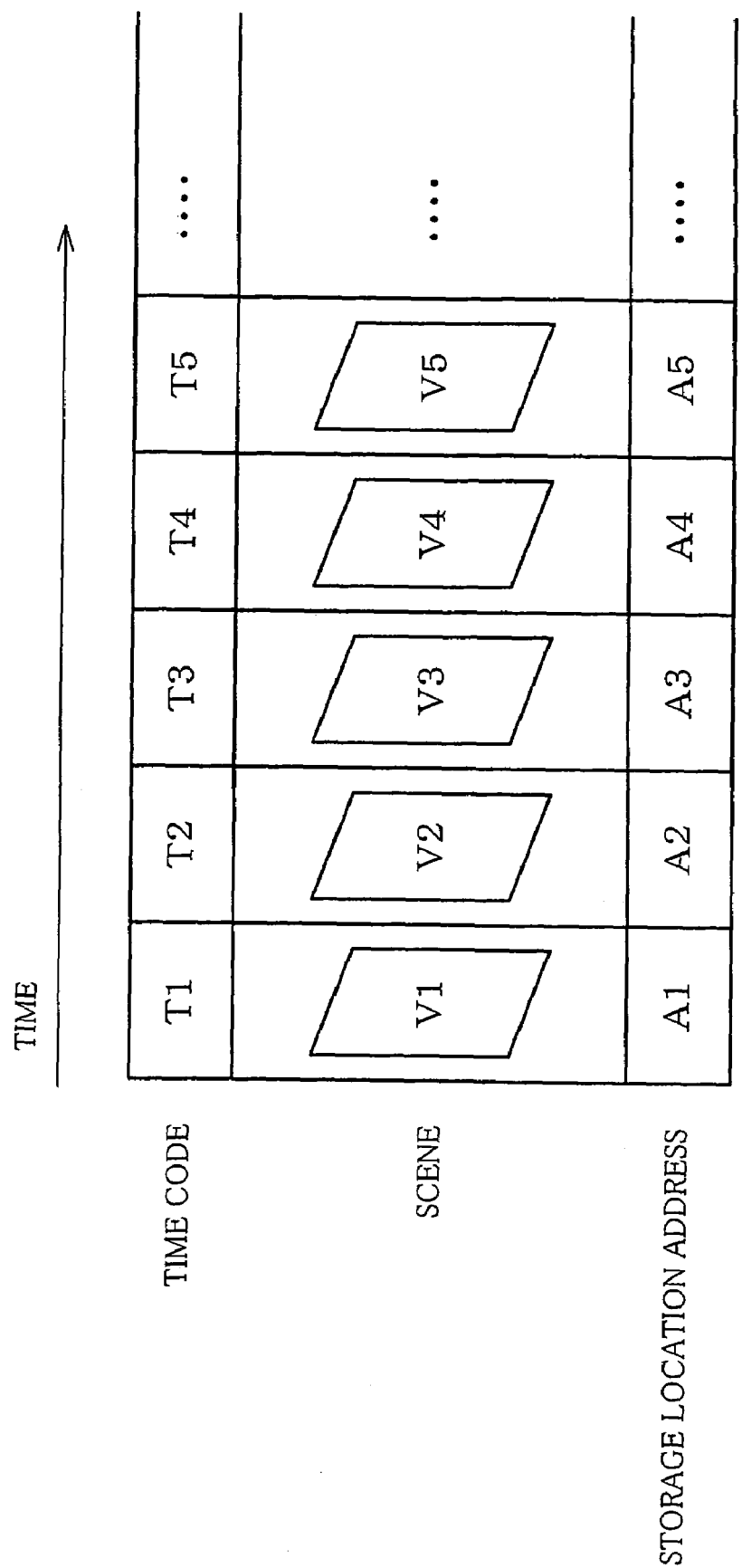
FIG. 4 is a diagram illustrating a structure of information in contents data reproduced by the recording/reproducing apparatus shown in FIG. 1.

FIG. 4 illustrates an example of a structure of information included in the contents data reproduced by the present recording/reproducing apparatus. In FIG. 4, the contents data is made up of a series of scenes V1, V2, . . . , and Vn (n is an integer). Each scene is made up of image information and audio information. Here, the scenes respectively have (i) time codes T1, T2, . . . , and Tn; and (ii) storage location addresses A1, A2, . . . , and An. Each of the time codes indicates reproduction timing, and each of the storage location addresses indicates an address (an address on the storage medium) in which the scene is stored. Note that the time code can be used as the resume point information.

In the present recording/reproducing apparatus, the image information and the audio information can be continuously reproduced by reproducing the scenes in the order of the time codes. Moreover, by designating an arbitrary time code, the contents data of a scene corresponding to the time code can be read out and reproduced from a storage location address of the scene.

Figure 5:
FIG. 5 is an explanatory diagram illustrating a structure of the contents data stored in the optical disc reproduced by the recording/reproducing apparatus shown in FIG. 1.
Figure 6:
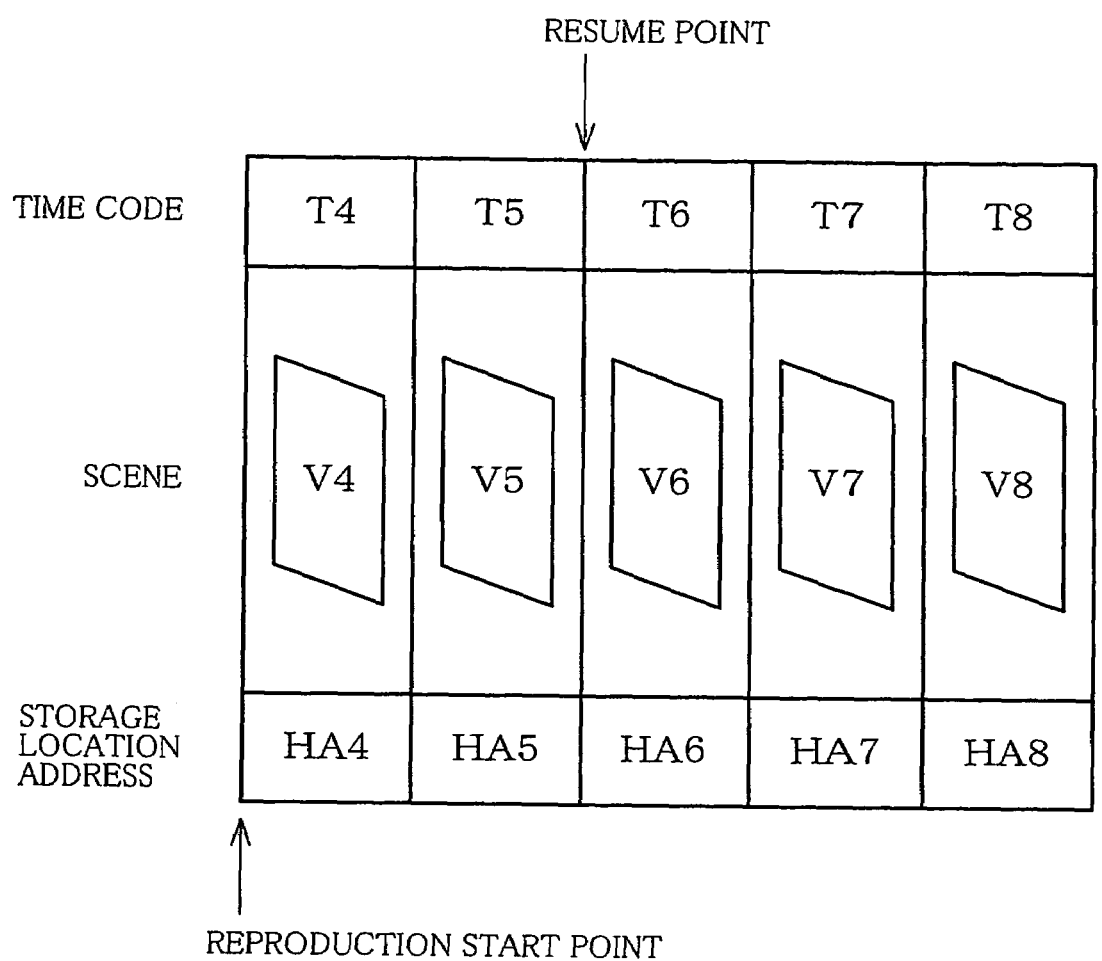
FIG. 6 is an explanatory diagram illustrating a structure of partial contents data stored in the contents data memory section of the recording/reproducing apparatus shown in FIG. 1.

Next, the following explains a stream of the contents data used in the present recording/reproducing apparatus with reference to FIG. 5 and FIG. 6.

FIG. 5 illustrates an example of a structure of the contents data stored in the optical disc 17. As shown in FIG. 5, the contents data in the optical disc 17 is made up of a series of scenes V1, V2, . . . , V9, and so on. The scenes have (i) respective time codes T1, T2, . . . , T9, and so on; and (ii) respective storage location addresses DA1, DA2, DA9, and so on, respectively.

FIG. 6 illustrates an example of a structure of the partial contents data stored in the contents data memory section 18, and the structure is made based on the contents data shown in FIG. 5. The partial contents data (partial stream) is data required for the reproduction from the resume point.

The partial contents data stored in the contents data memory section 18 is data obtained by copying the contents data that falls within range from the resume point to a point that corresponds to a predetermined time code. Here, as shown in FIG. 6, the partial contents data is made up of the scenes V4 through V8 which are copied from the contents data that falls within a range from (i) the resume point (the scene V6 specified by the time code T6, in this case) shown in FIG. 5, to (ii) a point (the scene V4 specified by the time code T4, in this case) preceding the resume point by a certain time. The scenes of the partial contents data have the time codes T4 through T8, which are the same as those of the contents data, respectively. Moreover, the scenes of the partial contents data have storage location addresses HA4 through HA8 in the contents data memory section 18, respectively.

In a general resume function, the reproduction of the contents data may be carried out from the resume point. However, the reproduction from the point shortly before the resume point has such an advantage that the user can surely recognize the halted scene. The point shortly before the resume point is not particularly defined, but may be several seconds before the resume point.

Note that the resume point (reproduction halt position) or the point before the resume point may be set as a start point of the contents data that is stored as the partial contents data in the contents data memory section 18.

The following description deals with the switching operation from (i) the reproduction of the partial contents data stored in the contents data memory section 18, to (ii) the reproduction of the contents data stored in the optical disc 17. The switching operation is carried out with the use of the contents data and the partial contents data.

When resuming reproduction of the optical disc 17 by using the present recording/reproducing apparatus in the resume mode, the, reproduction is carried out in the following manner. That is, the partial contents data, which is accumulated in the contents data memory section 18 shown in FIG. 6 and which corresponds to the scenes V4 through V8, are firstly recorded onto the buffer memory 20 at high speed, and then are read out from the buffer memory 20 at low speed. After finishing reproduction of the scenes V4 through V8 read out from the buffer memory 20, the readout from the optical disc 17 is carried out. The system control apparatus 11 beforehand instructs the disc recording/reproducing section 15 to reproduce the optical disc 17 from the scene V9. Therefore, the contents data corresponding to the scenes V9 and later is read out from the optical disc 17, and is written in the buffer memory 20. The contents data corresponding to the scenes V9 and later are coupled with the data (i) which is read out from the contents data memory section 18 and (ii) which terminates at the scene V8. This allows generation of the continuous data.

Here, the partial contents data, and the contents data have the common time codes T4 through T8. This enables the data coupling in the switching operation from (i) the reproduction of the partial contents data from the contents data memory section 18, to (ii) the reproduction of the contents data from the optical disc 17. Specifically, according to the time codes T8 and T9 respectively specifying the scenes V8 and V9, the scene V8 of the partial contents data reproduced from the contents memory means 18 is coupled, in the buffer memory 20, with the next scene V9 of the contents data reproduced from the optical disc 17. This allows uninterrupted reproduction after this, too.

Note that, it is preferable that time of reproducing the partial contents data stored in the contents data memory section 18 be set equal to or longer than maximum time required for the initial process such as the laser power adjustment and the readout of the TOC information. With this, the initial process has already been completed when reproduction of all the scenes of the partial contents data from the contents data memory section 18 is finished. Therefore, the contents data read out from the optical disc 17 can be reproduced just after finishing the reproduction of the partial contents data. In other words, the switching operation is uninterruptedly carried out from (i) the reproduction of the partial contents data stored in the contents memory section 18, to (ii) the reproduction of the contents data read out from the optical disc 17. This allows an uninterrupted display of the reproduced information on the information output section 13.

Figure 7:
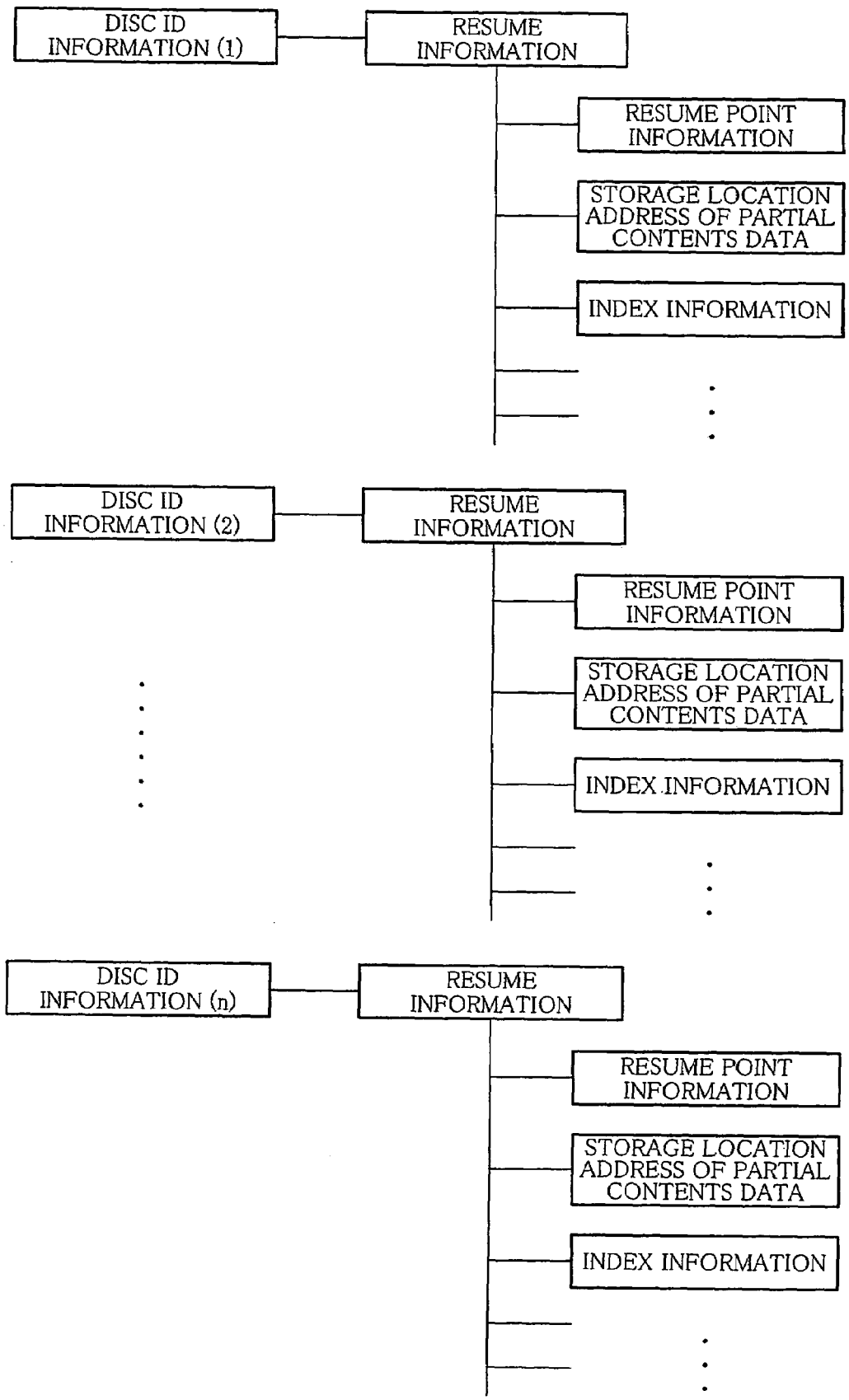
FIG. 7 is an explanatory diagram illustrating a structure of a disc ID management table for managing the disc ID and the resume information, each of which is stored in a work memory of the recording/reproducing apparatus shown in FIG. 1.

The following description explains the disc ID management table stored in the work memory 19 with reference to FIG. 7.

FIG. 7 illustrates an example of a structure of the disc ID management table that is stored in the work memory 19 and that manages the disc ID and the resume information. The disc ID management table includes aggregates of n-number (n is an integer) of disc ID information. The disc ID information is information indicating the aforementioned uniquely distinguishable disc ID, and is correlated with the resume information. The resume information includes the resume point information; the storage location address of the partial contents data in the contents data memory section 18; and the like. In reference to the disc ID management table, the system control section 11 can resume reproduction even in the case where the optical disc 17 is ejected and reinserted.

Further, the disc ID information may be stored in the disc ID management table in such a manner that the disc ID information is correlated with information indicating the content of the optical disc 17 corresponding to the disc ID information. Here, the information indicating the content of the optical disc 17 is considered to be the index information including (i) the title of the contents data included in the optical disc 17; (ii) the reproduction time of the contents data; (iii) the thumbnail image for the reference of the contents data; (iv) the time code of the contents data; (v) the storage location address of the contents data on the optical disc; and the like.

Note that the information indicating the content of the optical disc 17 is not limited to the above. The index information may further include (i) secondary information about the contents data, such as a recorded date and a channel of a recorded television program; (ii) information relating to the optical disc 17, such as time required for the initial process of reproducing the optical disc storing the contents data.

The following explains a way of using the index information. When the disc ID recognition system 16 recognizes the disc ID of the optical disc 17, the system control section 11 searches for relevant disc ID information in the disc ID management table of the work memory 19. When there is relevant disc ID information, the system control section 11 acquires resume information that corresponds to the disc ID information. Here, when the user requires a display of the contents selection menu via the user operation section 14, the system control section 11 uses, for instance, the index information contained in the acquired resume information, and causes the information output section 13 to display the contents selection menu. Moreover, the present recording/reproducing apparatus can be arranged such that the user can select, from the displayed contents selection menu via the user operation section 14, the contents to be reproduced or the reproduction start point. This allows the reproduction from an arbitrary point rather than from the resume point.

The above function can be used to select resume information of a target disc among respective sets of resume information of a plurality of discs. In such a case, any information stored in the work memory 19 can be displayed on the information output section 13 for the sake of the selection. However, when displaying the disc IDs, each of the disc IDs is just a list of numbers and alphabets and is elusive and meaningless information making little sense to the user. Therefore, it is difficult for the user to identify the target disc from the disc ID. Instead of the disc ID, if a unique disc ID made in advance by the user is displayed, the selection can be carried out with ease.

Note that it is also possible to realize (i) the control method carried out by the system control section 11, and (ii) the aforementioned functions of various means that the system control section 11 serves as by causing a computer to execute a reproducing apparatus control program. Examples of the means includes: the memory content management means, the deactivating means, the deleting means, the reproduction halt control means, the reproduction start control means, and the reproduction control means. In this case, a program code read out from a storage medium realizes the functions and the method, and the storage medium storing the program code is therefore a component of the present invention. The storage medium for supplying the program code can be so configured as to be detachable from the apparatus. Moreover, the storage medium may be a storage medium which holds the program code in a fixed manner. Moreover, the storage medium may be attached to the apparatus so that the computer can directly read out the recorded program code. Alternatively, the storage medium may be attached, as an external memory apparatus, to a program reading apparatus connected to a system or the apparatus so that the computer can read out the recorded program code via the program reading apparatus.

As described above, the recording/reproducing apparatus of the present invention is a recording/reproducing apparatus that reproduces information in the exchangeable optical disc 17, and includes: (i) the disc recording/reproducing section 15 for reproducing the information in the optical disc 17; (ii) the disc ID recognition section 16 for recognizing the disc ID for identifying the optical disc 17; (iii) the work memory 19 for storing the information including the disc ID; and (iv) the system control section 11. When halting the reproduction of the optical disc 17, the system control section 11 causes the work memory 19 to store the disc ID of the optical disc 17 and the resume point information in such a manner that the disc ID and the resume point information are correlated with each other. This is for the sake of starting next reproduction from the halt position. The disc ID is recognized by the disc ID recognition section 16, and the resume point information is information that can indicate a physical point from which the disc recording/reproducing section 15 should start reproduction of the optical disc 17. Further, when starting to reproduce the optical disc 17, the system control section 11 controls the reproduction start point, from which the disc recording/reproducing section 15 starts reproducing, in accordance with the resume point information that is stored in the work memory 19 and that corresponds to the disc ID of the optical disc 17 recognized by the disc ID recognition section 16.

With this, the reproducing apparatus of the present invention can resume reproduction from the point at which the last reproduction was halted, as long as the reproducing apparatus has once reproduced the optical disc having the disc ID, in the following cases (1) through (3): (1) a case where the optical disc is reproduced and is never ejected from the reproducing apparatus before resuming the reproduction of the optical disc; (2) a case where the optical disc is reproduced and ejected, but is never exchanged and is reinserted in the reproducing apparatus before resuming the reproduction of the optical disc; and (3) a case where the optical disc is reproduced, ejected, and another optical disc(s) is reproduced, and the optical disc (the initially inserted optical disc) is reinserted, before resuming the reproduction of the optical disc. The resuming is carried out in accordance with the resume point information that corresponds to the optical disc (initially inserted optical disc) and that is stored in the work memory 19.

Moreover, the reproducing/recording apparatus of the present invention can resume reproduction from the point at which the last reproduction was halted as long as the reproducing/recording apparatus has once reproduced the optical disc having the disc ID, in the case where the optical disc is reproduced, ejected, and another optical disc(s) is reproduced or recorded, and the optical disc (the initially inserted optical disc) is reinserted, before resuming the reproduction of the optical disc. The resuming is carried out in accordance with the resume point information that corresponds to the initially inserted optical disc and that is stored in the work memory 19.

Further, it is possible to deactivate the resume operation for each optical disc, and to change the resume point thereof by modifying the resume information. Specifically, the deactivation of the resume operation and the change in the reproduction start point can be carried out by accessing the modified resume information that corresponds to the specific optical disc and that is stored in the work memory 19.

The invention being thus described, it will be obvious that the same way may be varied in many ways. Such variations are not to be regarded as a deviation from the spirit and scope of the invention, and all such modifications as would be obvious to one skilled in the art are intended to be included within the scope of the following claims.

Embodiment 2

The following description fully explains Embodiment 2 according to the present invention. Embodiment 2 to be explained here deals with an example of resuming the reproduction so that the user can sufficiently recognize the content reproduced before the reproduction halt.

Figure 8:
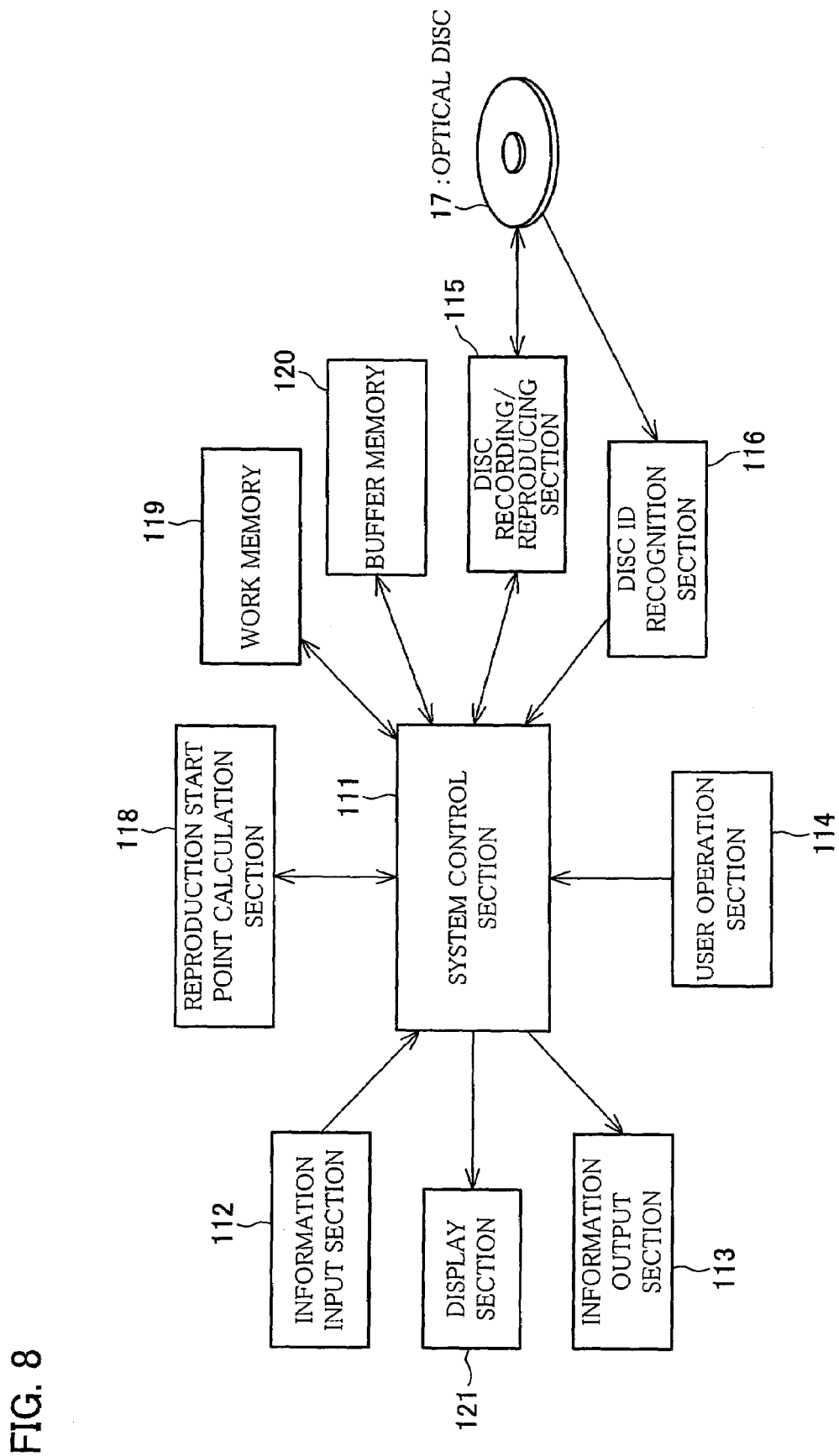
FIG. 8 is a block diagram illustrating a structure of a recording/reproducing apparatus according to another embodiment of the present invention.

FIG. 8 illustrates an example of a structure of a recording/reproducing apparatus having functions of the reproducing apparatus according to the present invention. In FIG. 8, the present recording/reproducing apparatus mainly includes: a system control section 111, an information input section 112, an information output section 113, a user operation section 114, a disc recording/reproducing section 115, a disc ID recognition section 116, a reproduction start point calculation section 118, a work memory 119, a buffer memory 120, and a display section 121.

Note that, here, a recording/reproducing apparatus having a recording function is explained as an embodiment of the reproducing apparatus of the present invention; however, the reproducing apparatus of the present invention does not necessarily require the recording function. Also, an optical disc 17 used as the information storage medium is rewritable, but is not necessarily required to be rewritable.

The disc recording/reproducing section 115 receives input content data, such as image information and audio information, supplied from the information input section 112 via the system control section 111, and can convert the content data into data that can be recorded onto the optical disc 17, and can record the data onto the optical disc 17.

Moreover, the disc recording/reproducing section 115 serves as the reproducing means. In other words, the disc recording/reproducing section 115 is so arranged that: the disc recording/reproducing section 115 is capable of extracting the content data from the optical disc 17, and is capable of converting the extracted content data to data that can be reproduced by the information output section 113, and is capable of sending the converted data to the system control section 111.

Further, the disc recording/reproducing section 115 carries out an initial process in response to an instruction from the system control section 111. The initial process is carried out in the following manner. Firstly, the disc recording/reproducing section 115 makes a laser power adjustment; a disc tilt adjustment; and various adjustments of optical head, such as aberration correction; and the like. The adjustments allows for reproducing and recording of information with respect to the optical disc 17. After that, the disc recording/reproducing section 115 reads out TOC (Table Of Contents) information, and carries out settings of parameters in accordance with the TOC information. Moreover, the disc recording/reproducing section 115 is so arranged as to be capable of notifying, to the system control section 111, completion of the initial process when the initial process is completed.

The optical disc 17 stores (i) the contents data such as image information and audio information; (ii) the TOC data that is management information of such data and information; and the like. Some optical disc 17 includes an ID (disc ID, identification code), which is identification information for identifying the disc.

Here, examples of the optical disc 17 include not only optical discs such as a DVD, but also a magnet-optical disc. Further, instead of the optical disc 17, a magnetic disc may be used. The present recording/reproducing apparatus is particularly suitable for a storage medium which requires the initial process for the reproduction of the contents data. Further, the contents data is just an example of data stored in the optical disc 17, and is not limited to the contents data.

The disc ID recognition section 116 serves as recognition means for reading out and recognizing the disc ID when the optical disc 17 having the disc ID is inserted (loaded) in the present recording/reproducing apparatus. Here, the disc ID recognition section 116 is so arranged as to acquire the disc ID from a bar code printed on a paper label (identification seal), which paper label is adhered to the optical disc 17 or a cartridge containing the optical disc 17.

In other words, the identification seal is adhered, by the user, to the predetermined portion of the optical disc 17 or the cartridge so that the disc ID of the optical disc 17 is recognized by the present recording/reproducing apparatus (disc ID recognition section 116). When the disc ID is recognized, the disc ID recognition section 116 transmits the information to the system control section 111.

Note that the way of recognizing the disc ID by the disc ID recognition section 116 is not limited to the aforementioned example. For example, the disc ID may be recognized from a non-contact accessible IC chip that is provided on the optical disc or the cartridge, and that stores the disc ID. Also, in cases where the optical disc 17 is a DVD, it is possible to use an identification code written in a recording film (surface) outside recording and reproducing regions of the optical disc 17. A specific example of the region outside recording and reproducing regions is a BCA (Burst Cutting Area) region. Note that the BCA is also adopted in optical discs other than a DVD.

The information input section 112 is so arranged as to receive contents data of television broadcasting or the like, and to supply the received contents data to the system control section 111. Moreover, the information input section 112 can include a decode function for decompressing (extending) contents data which has been compressed.

The information output section 113 has a function for reproducing the contents data sent from, the system control section 111. Specifically, the information output section 113 sends image information of the contents data to an image display apparatus such as a liquid crystal display apparatus or a CRT (Cathode Ray Tube), and also sends audio information thereof to an audio output apparatus such as a speaker. Moreover, the information output section 113 can reproduce a contents selection menu.

Here, the contents selection menu refers to index information indicating the contents of the optical disc 17. The contents selection menu includes (i) a displayed list of titles of the image information, etc. stored in the optical disc 17; (ii) a displayed catalogue of thumbnail images showing image composition samples, and the like. The user selects a desired menu of the contents selection menu via the user operation section 114. This allows the selected information to be notified from the user operation section 14 to the system control section 111.

The user operation section 114 is provided with a reproduction key, a stop key, a search key, and the like, each of which is used for the user operation. Via the user operation section 114, a resume operation can be selected to be ON or OFF (the resume mode is selected or not). The operation section 114 can be used by the user for various inputs to the present recording/reproducing apparatus. Examples of these inputs are: (i) a relative deviation amount from the reproduction halt position in the resume operation; (ii) a pause time at the reproduction halt position; and the like. Hereinafter, these sets of information are referred to as reproduction start point information.

The work memory 119 is an information memory apparatus for storing a disc ID management table and other various sets of information. As is later described, the disc ID management table includes: (i) information (halt position information) indicating the disc ID and the reproduction halt position used for the resume function of the present recording/reproducing apparatus; (ii) information (reproduction start point information) indicating the relative deviation amount from the reproduction halt position; and the like. The reproduction halt position indicates a point at which reproduction is halted.

Moreover, the halt position information may include, for example, a date and time when a reproduction of the optical disc 17 is halted. In this case, the information of the date and time makes it possible to identify an order in which data are stored in the work memory 119. This allows the system control section 111 to have a function to delete the data, in the work memory 119, from the oldest one in the order stored, in the event of running short of free storage capacity therein. In other words, the system control section 111 serves as memory content management means.

The work memory 119 is constituted by a memory that can hold data even when the power source is not supplied to the present recording/reproducing apparatus.

Note that, it is preferable that the work memory 119 contain at least two types of information; (i) disc IDs of a plurality of optical discs, and (ii) respective sets of the halt position information that correspond to disc IDs. Moreover, it is preferable that the work memory 119 be so arranged as to be able to store information like the reproduction start point information when it is required to change the reproduction start point of each storage medium. Moreover, it is preferable that the work memory 119 be exchangeable, because this allows the work memory 119 to deal with, by adjusting the storage capacity, the case where a larger amount of information should be stored. Alternatively, the work memory 119 may be expandable by a specific memory.

Here, the information in the work memory 119 can be read by the system control section 111, and can be updated in accordance with instructions of the system control section 111.

In the present embodiment, a self-holding semiconductor memory (flash memory) is used for the work memory 119; however, use of a small and detachable hard disk apparatus for the work memory 119 allows a similar effect to the present embodiment. Here, the wording "self-holding" indicates a function for holding stored information even when power source is not supplied.

The buffer memory 120 is an information memory apparatus for temporarily storing the contents data read out from the optical disc 17. The buffer memory 120 carries out data input and data output in the following manner. That is, the data writing is carried out fast and intermittently, and the data reading is carried out slowly and continuously. Moreover, the buffer memory 120 is so arranged that a certain amount of accumulated data is always accumulated therein. The accumulated contents data in the buffer memory 120 is used to allow for uninterrupted reproduction even when the reproduction from the optical disc 17 cannot be carried out due to, e.g., de-tracking caused by externally applied vibration.

Further, in cases where the recording/reproducing apparatus is a stationary apparatus, a part of the buffer memory 120 can be, used as a working memory for expansion of image and audio digital data, compression thereof, A/D (analog/digital) conversion thereof, D/A (digital/analog) conversion thereof, and the like.

The reproduction start point calculation section 118 is so arranged as to carry out calculation to determine the reproduction start point from the reproduction halt position of the last reproduction. The calculation is carried out in accordance with the halt position information and the reproduction start point information, each of which is stored in the work memory 119. Via the user operation section 114, it is possible to manually input the relative deviation amount of the reproduction start point from the reproduction halt position. Alternatively, the reproduction start point calculation section 118 may be arranged such that manually settable parameters may include not only the relative deviation amount from the reproduction halt position, but also start time (suspension time from (i) a pause (suspension) while outputting the reproduction start point information, to (ii) the restart of the reproduction). Moreover, such a calculation function may be included in the system control section 11. Note that the memory means of the present invention is not necessarily constituted by merely the work memory 119, so that a specific memory for the calculation may be provided.

The system control section 111 can be so arranged that, in response to the user's instruction sent to the system control section 111 via the user operation section 114, the halt position information stored in the work memory 119 is displayed on the information output section 113, which serves as the display section.

In this case, the present recording/reproducing apparatus can be arranged such that the user uses the user operation section 114 to designate how much time the reproduction start point is to be deviated from the reproduction halt position. In response to the designation of the time (deviation amount), the reproduction start point calculation section 118 may determine the reproduction start position according to the halt position information, and may resume the reproduction. Moreover, the time deviation (deviation amount) from the reproduction halt position can be 0, and the suspension time at the reproduction halt position can be designated.

Note that, because the halt position information stored in the work memory 119 is correlated with the disc ID, it is easy for the user to change the reproduction start point of each disc.

When the reproduction of the optical disc 17 is halted, the system control section 111 causes the work memory 119 to store the halt position information and the storage medium information (identification information) recognized by the disc ID recognition section 116 in such a manner that the halt position information and the storage medium information are correlated with each other. When receiving a reproduction start instruction, the system control section 111 deviates the reproduction start point, by the designated (set) time, from the reproduction halt position, and starts reproduction. As described above, the reproduction start point is the calculation result determined by the reproduction start point calculation section 118.

Further, when starting reproduction of the optical disc 17, the system control section 111 serves as reproduction start control means for controlling the reproduction, carried out by the present recording/reproducing apparatus, in accordance with the halt position information that corresponds to the disc ID recognized by the disc ID recognition section 116.

Further, the system control section 111 controls the operations of the blocks shown in FIG. 8, and controls the data input and data output among the blocks in accordance with input operation sent by the user via the user operation section 114.

Note that the present recording/reproducing apparatus is arranged such that: the reproduction start point can be deviated from the reproduction halt position, and the reproduction can be suspended at the reproduction halt position for a certain period of time. These are enabled by providing the reproduction start point calculation section 118.

The display section 121 is constituted by, for example, a small liquid crystal display or the like, and has a function for displaying lettered information such as an operational state of the present recording/reproducing apparatus, number of track presently reproduced, elapsed time of recording or reproduction, and track mode information. Moreover, the display section 121 displays the disc ID of each disc, which is recognized upon the start of the reproduction and the halt position information.

The resume operation in the present embodiment will be explained below with reference to FIG. 9 and FIG. 10.

Figure 9:
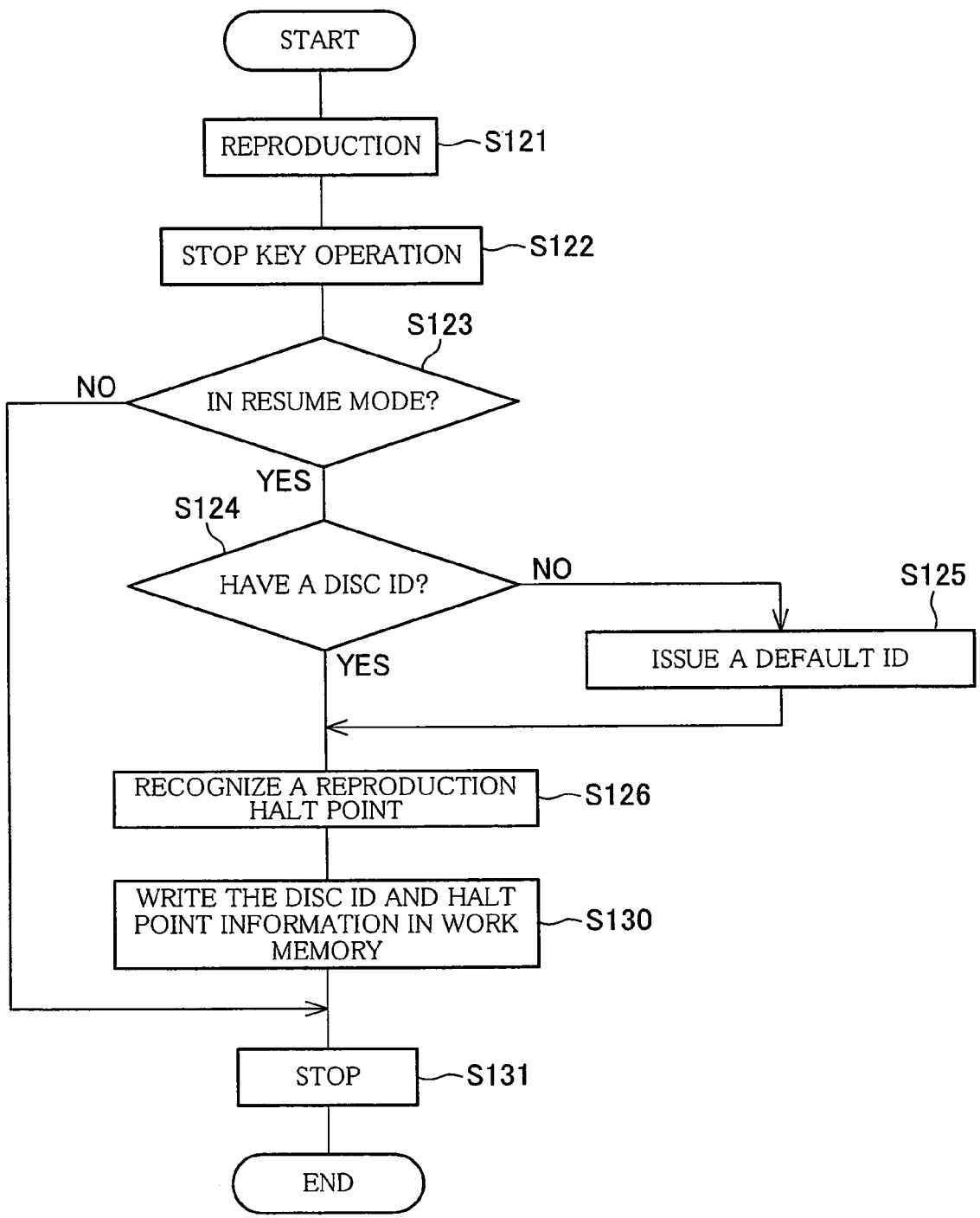
FIG. 9 is a flowchart illustrating a resume operation carried out by the recording/reproducing apparatus shown in FIG. 8 when halting reproduction.
Figure 10:
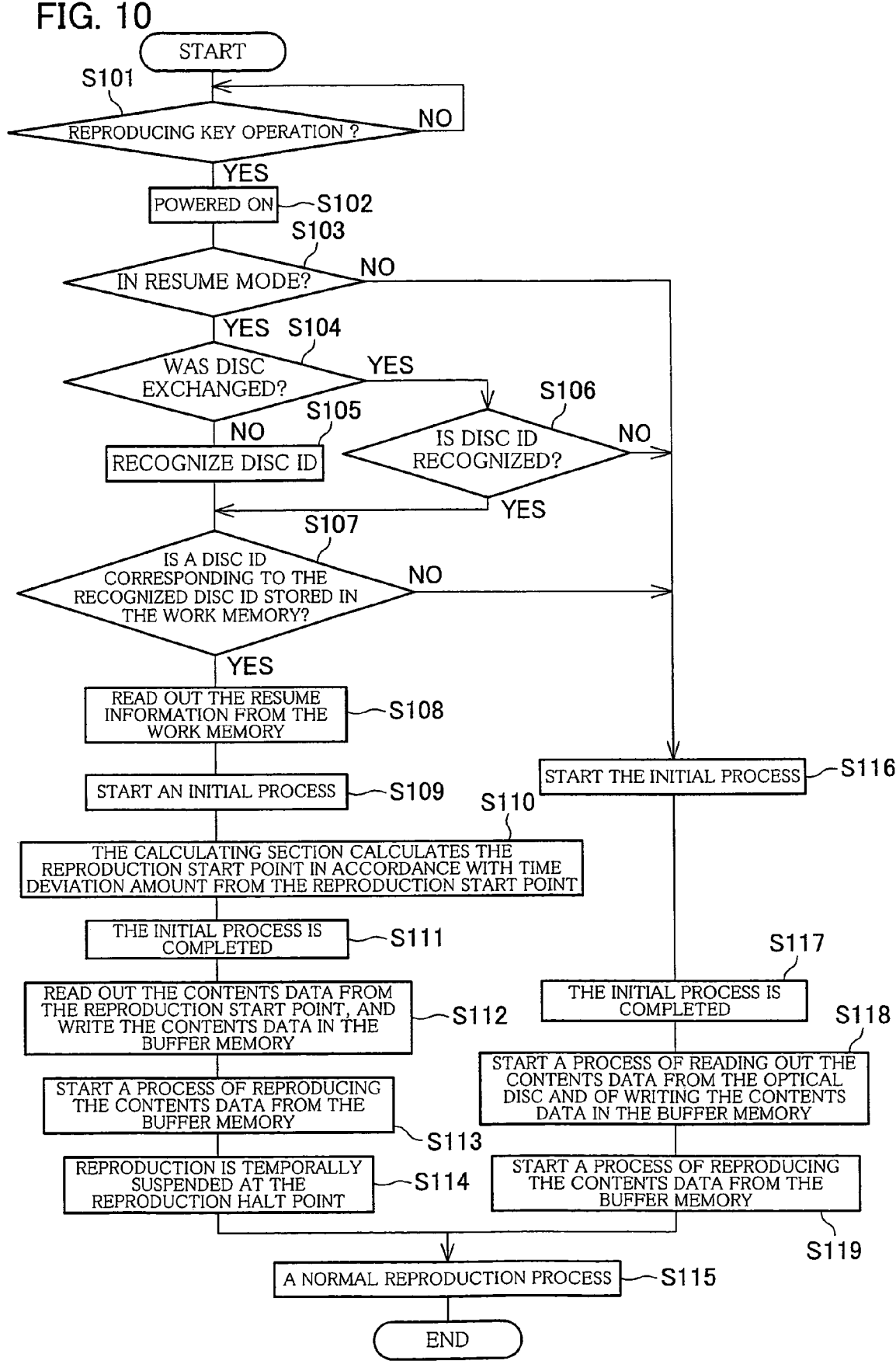
FIG. 10 is a flowchart illustrating a resume operation carried out by the recording/reproducing apparatus shown in FIG. 8 upon reproduction.

FIG. 9 is an example of a flowchart illustrating a resume operation of the present recording/reproducing apparatus during halting of a reproduction.

The flowchart illustrates a flow in which a reproduction of the optical disc 17 is halted. That is, while the present recording/reproducing apparatus is reproducing the optical disc 17 (S121), the user operates a stop key provided in the user operation section 114 (S122). Note that the user can set the resume operation ON or OFF via the user operation section 114. Based on the setting, the system control section 111 judges whether or not a resume mode is set in the present recording/reproducing apparatus (S123).

In cases where it is judged that a resume mode is not set in the present recording/reproducing apparatus, the system control section 111 controls the disc recording/reproducing section 115 to stop the reproduction (S131).

In cases where it is judged that a resume mode is set in the present recording/reproducing apparatus in S123, the system control section 111 checks whether or not the disc ID recognition section 116 has recognized the disc ID of the optical disc 17 when the optical disc 17 was inserted (S124). In cases where the disc ID has been recognized, the sequence goes to S126.

Some optical discs do not have disc IDs. In this case, the disc ID recognition section 116 cannot recognize each of the disc IDs. In view of the circumstances, the disc ID recognition section 116 issues a default ID, as identification information, to each of the optical discs having no disc IDs that is recognizable by the disc ID recognition section 116 (S125).

When the disc ID is recognized in S124 or the default ID is issued in S125, the system control section 111 recognizes the reproduction halt position in accordance with the halt position information that is stored in the work memory 119 with the disc ID correlated (or with the default ID correlated in cases where the default ID is issued in S125; the same is true in the description below) (S126).

Next, the system control section 111 causes the work memory 119 to store the disc ID of the optical disc 17 and the halt position information (S130). Note that the information stored in the work memory 119 may include a recorded date, a recorded order, and the like.

Further, a unique ID (unique disc name) may be prepared for the disc ID by the user, and be stored in the work memory 119. In this case, the unique ID may be manually entered via the user operation section 114. Note that the unique ID thus prepared is used for display to allow the user to recognize the identification of the optical disc with ease. Note also that, it is preferable that the disc ID be used for the identification recognition by the disc ID recognition section 116.

In this way, when completing storing the data required for the resume operation in next reproduction, the normal stop operation is carried out (S131) to end the resume operation.

Note that the default ID issued in S125 is set for an optical disc whose disc ID is unrecognizable by the disc ID recognition section. In the present recording/reproducing apparatus, the default ID is issued when the disc ID recognition section 116 cannot recognize the disc ID (or recognizes that there is no disc ID), and is stored with the halted information correlated.

For this reason, the resume operation can be carried out with respect to an optical disc having no disc ID. Note that the disc ID is used in order to allow for the resume operation even when discs are exchanged. However, in the present invention, in cases where the resume operation is so set as not to be carried out when the disc is exchanged, there is no need for the disc ID recognition section 116 that recognizes the disc ID and issues the default ID.

For the default ID, a unique default ID (another name) may be prepared by the user, and may be stored in the work memory 119. A way of entering the unique default ID is similar to the way of preparing the unique ID for the disc ID stored in the work memory 119.

The unique default ID is used for a display to allow the user to confirm which disc is operated by the user. Therefore, for the resume operation of an optical disc whose disc ID is not recognized, the default ID is used. The default ID is set by the system control section 11 and is stored in the work memory 119.

Next, the following description deals with a resume operation of the present recording/reproducing apparatus during the reproduction. FIG. 10 is an example of a flowchart illustrating the resume operation of the present recording/reproducing apparatus during the reproduction.

The present recording/reproducing apparatus is assumed to be powered ON in response to an operation of the reproduction key provided in the user operation section 114. Note that the power ON may be carried out in response to the insertion of the optical disc 17.

Upon the operation of the reproduction key (S101), the system control section 111 firstly turns ON the power of the system (S102).

Next, the system control section 111 judges whether or not a resume mode is set in the present recording/reproducing apparatus (S103). When it is judged that a resume mode is not set in the present recording/reproducing apparatus, the sequence goes to a normal reproduction routine (S116 through S119).

In cases where the present recording/reproducing apparatus is in the resume mode in S103, the system control section 111 judges whether or not the optical disc 17 has been exchanged during the power OFF or the like (S104). The judgment may be carried out in accordance with, for example, detection of an open/close operation of a cover of a disc loading opening through which the optical disc 17 is loaded.

In the case where it is judged that the optical disc 17 has not been exchanged (changed), the system control section 111 causes the disc ID recognition section 116 to read out and recognize the disc ID from the optical disc 17 (S105). Note that, in cases where the disc ID cannot be recognized in S105 because, for example, the optical disc 17 inserted at the moment does not have its own disc ID, the default ID is prepared and is recognized as the disc ID.

Also in the case where it is judged that the optical disc 17 has been exchanged, the disc ID recognition section 116 reads out the disc ID and judges whether or not the disc ID has been recognized (S106). In cases where the disc ID cannot be recognized at this moment, the sequence goes to the normal reproduction routine (S116 through S119). A reason for this is as follows. That is, in the case where it is judged that an exchanging has been made, an optical disc which was previously loaded during the halting of a reproduction or an optical disc which had been loaded, during the halting of a reproduction, earlier than the previously loaded one is not necessarily the same as an optical disc, currently loaded, whose disc ID cannot be recognized.

Note that the disc ID of the optical disc 17 is recognized by the disc ID recognition section 116, and the information of the disc ID is read by the system control section 111.

Next, based on the disc ID (or default ID if the default ID is recognized in S105; the same is true in the description below) read by the disc ID recognition section 116, the system control section 111 searches and judges whether or not the work memory 119 has stored a disc ID corresponding to the disc ID recognized by the disc ID recognition section 16 (S107). Here, in cases where it is judged that no relevant disc ID is found in the work memory 119, the sequence goes to the normal reproduction routine (S116 through S119). Note that operations in the normal routine will be described in detail later.

On the other hand, in cases where a relevant disc ID is found in the work memory 119, the system control section 111 reads out, from the work memory 119, the halt position information that corresponds to the disc ID (S108).

Next, the initial process of the optical disc apparatus starts (S109). Here, the wording "the initial process of the optical disc apparatus" indicates such a process that: the system control section 111 controls the disc recording/reproducing section 115 to (i) make adjustments so that the disc recording/reproducing section 115 is ready for recording and reproduction; to (ii) read out the TOC (Table Of Contents) information from the optical disc 17; and to (iii) carry out settings of parameters in accordance with the TOC information. Examples of the adjustments include: the laser power adjustment; the disc tilt adjustment; and the various adjustments of the optical head, such as aberration correction.

Next, the system control section 111 causes the reproduction start point calculation section 118 to calculate to find the reproduction start point in accordance with the predetermined time deviation amount from the reproduction halt position indicated by the halt position information. Then, the system control section 111 instructs the disc recording/reproducing section 115 to start reproducing the data of the optical disc 17 in accordance with the calculation result (S110). The time deviation amount is predetermined by the user. It is sufficient that the time deviation amount falls within a range from 1 minute at the shortest to 3 minute, when reproducing, e.g., a moving image such as a movie.

After the initial process is completed (S111), the system control section 111 controls an optical head (not shown) of the disc recording/reproducing section 115 to read the contents data from the optical disc 17, and the system control section 111 writes the readout contents data in the buffer memory 120, and starts the reproduction process from the reproduction start point (reproduction start designation point) determined according to the calculation result (S112). The control is carried out in accordance with the halt position information and the TOC information that is read from the optical disc 17 by carrying out the initial process.

Thereafter, the system control section 111 causes the disc recording/reproducing section 115 to read out the contents data at a high-speed rate from the optical disc 17, and causes the buffer memory 120 to store the readout contents data. The contents data is continuously read out at a low-speed rate from the buffer memory 120, and is sent to the information output section 113 as the reproduction data (S113).

Thereafter, the reproduction goes on to the reproduction halt position. At the moment of reaching the reproduction halt position, the reproduction pauses (is temporally suspended) in cases where the present recording/reproducing apparatus is set so (e.g. when reproducing moving image content, a still image is displayed) (S114).

The pause of the reproduction may or may not be carried out as described above. In the case where the pause of the reproduction is carried out, the reproduction restarts in response to a reproduction instruction. After that, the normal reproduction process is carried out (S115), and the resume operation ends. Note that the reproduction instruction may be given by a user's reproduction operation (reproduction key operation) or by clock means, such as a timer, by which the reproduction is resumed after measuring set measure time (after certain time passes).

As described above, by deviating the reproduction start point from the reproduction halt position, it is possible for the user to recognize what was reproduced just before the reproduction halt. This allows easy recognition of the reproduced contents, especially when reproducing a moving image. Moreover, by temporally suspending the reproduction in the vicinity of the reproduction halt position, the user can easily recognize what he/she saw just before the halt (or last time).

Particularly in the case of resuming the reproduction of a moving image, a scene after the reproduction halt position is new to the user, so that the user needs time to recall the content that he/she saw before. The user can sufficiently recognize or can recall the content by resuming the reproduction from the point (past) before the reproduction halt position.

On the other hand, in the case of resuming the reproduction of music, i.e., resuming a tune halted in the middle, the reproduction may be set to start from a beginning of the tune (from a point before the reproduction halt position), instead of designating based on time.

Once ejecting the optical disc 17 having no disc ID, it is impossible to guarantee the correlation between the optical disc 17 and the halt position information. However, as long as the optical disc 17 is not exchanged, the optical disc 17 having no disc ID can be resumed in a similar manner that the optical disc 17 having the disc ID is resumed.

What makes this possible is, for example, to issue the aforementioned default ID. The default ID is issued to, for example, an optical disc 17 having no disc ID. Therefore, the present recording/reproducing apparatus may be arranged such that: the default ID and the halt position information are stored in the work memory 119 in such a manner that the default ID and the halt position information are correlated with each other. The default ID may be a common ID to, for example, any optical disc 17 whose disc ID is not identified. This allows all the sets of the halt position information to be stored with the disc IDs correlated, respectively.

Explained here will be the normal reproduction routine (S116 through S119), which is carried out (i) when the resume mode is not selected in S103, (ii) when no disc ID is recognized in S106, or (iii) when the work memory 119 contains no relevant disc ID to the disc ID recognized in S107.

The system control section 111 instructs the disc recording/reproducing section 115 to start the initial process (S116). When the initial process is completed, the present recording/reproducing apparatus is ready for recording and reproduction (S117). At the moment, the system control section 111 starts a process of reading and writing the contents data (S118). That is, the contents data is read out from the optical disc 17 via the disc recording/reproducing section 115, and is written in the buffer memory 120 at a high-speed rate.

When a certain amount of the contents data is written in the buffer memory 120, the system control section 111 starts a process of reproducing the contents data at a low-speed rate from the buffer memory 120 (S119). With this, the data is continuously read out at a low speed rate from the buffer memory 120, and is outputted as the reproduction data, and the sequence goes to the normal reproduction process (S115).

The following description explains the setting of the deviation amount of the reproducing start point with reference to FIG. 4.

FIG. 4 illustrates an example of a structure of information in the, contents data reproduced by the present recording/reproducing apparatus. In FIG. 4, the contents data is made up of a series of scenes V1, V2, . . . , and Vn (n is an integer). Each scene is made up of image information and audio information.

Here, the scenes respectively have (i) time codes T1, T2, . . . , and Tn, and (ii) storage location addresses A1, A2, . . . , and An. Each of the time codes indicates reproduction timing, and each of the storage location addresses indicates where in the storage medium each scene is stored. Note that the time code can be used as the halt position information.

In the present recording/reproducing apparatus, the image information and the audio information can be continuously reproduced by reproducing the scenes in an order of the time codes. Moreover, by designating an arbitrary time code, the contents data can be read out from a storage address of a scene that corresponds to the time code, and can be reproduced.

Figure 11:
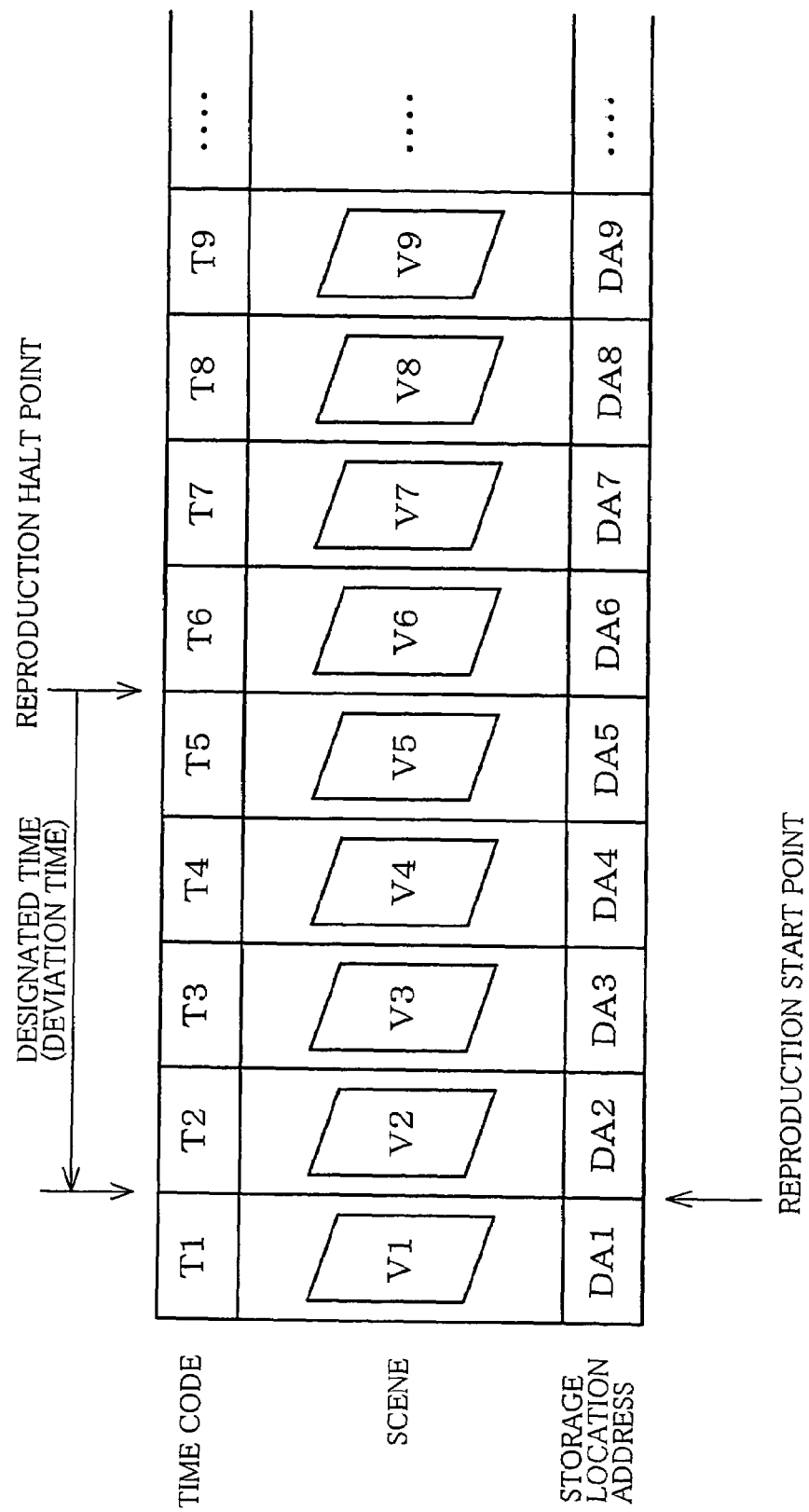
FIG. 11 is an explanatory diagram illustrating (i) a structure of contents data stored in an optical disc reproduced by the recording/reproducing apparatus shown in FIG. 8; and (ii) a reproducing method of the present invention.

Next, the following explains a reproducing method used when the resuming is carried out by the present recording/reproducing apparatus with reference to FIG. 11.

FIG. 11 illustrates an example of a structure of the contents data stored in the optical disc 17. As shown in FIG. 11, the contents data in the optical disc 17 is made up of a series of scenes V1, V2, . . . , V9, and so on. The scenes have (i) a series of time codes T1, T2, . . . , T9, and so on, respectively; and have (ii) a series of storage location addresses DA1, DA2, . . . , DA9, and so on, respectively.

As shown in FIG. 11, the reproduction halt position is DA5. The reproduction start point, from which the reproduction starts, is designated according to the resume instruction so as to be deviated by the designated time (deviation amount), i.e., be deviated from the time code (T5) of the reproduction halt position to the time code (T2). The address DA2 that corresponds to the time code (T2) is determined as an address of the reproduction start point. Note that the determination calculation is carried out by the reproduction start point calculation section 118.

Further, in the present invention, the reproduction starting from DA2 can be controlled to pause at the reproduction halt position DA5. The pause state may manually revert to the reproduction state by using a reproduction button, or may revert thereto by a timer that causes the reversion after certain time passes. Of course, the present invention can be arranged such that the reproduction never pauses at the reproduction halt position.

Figure 12:
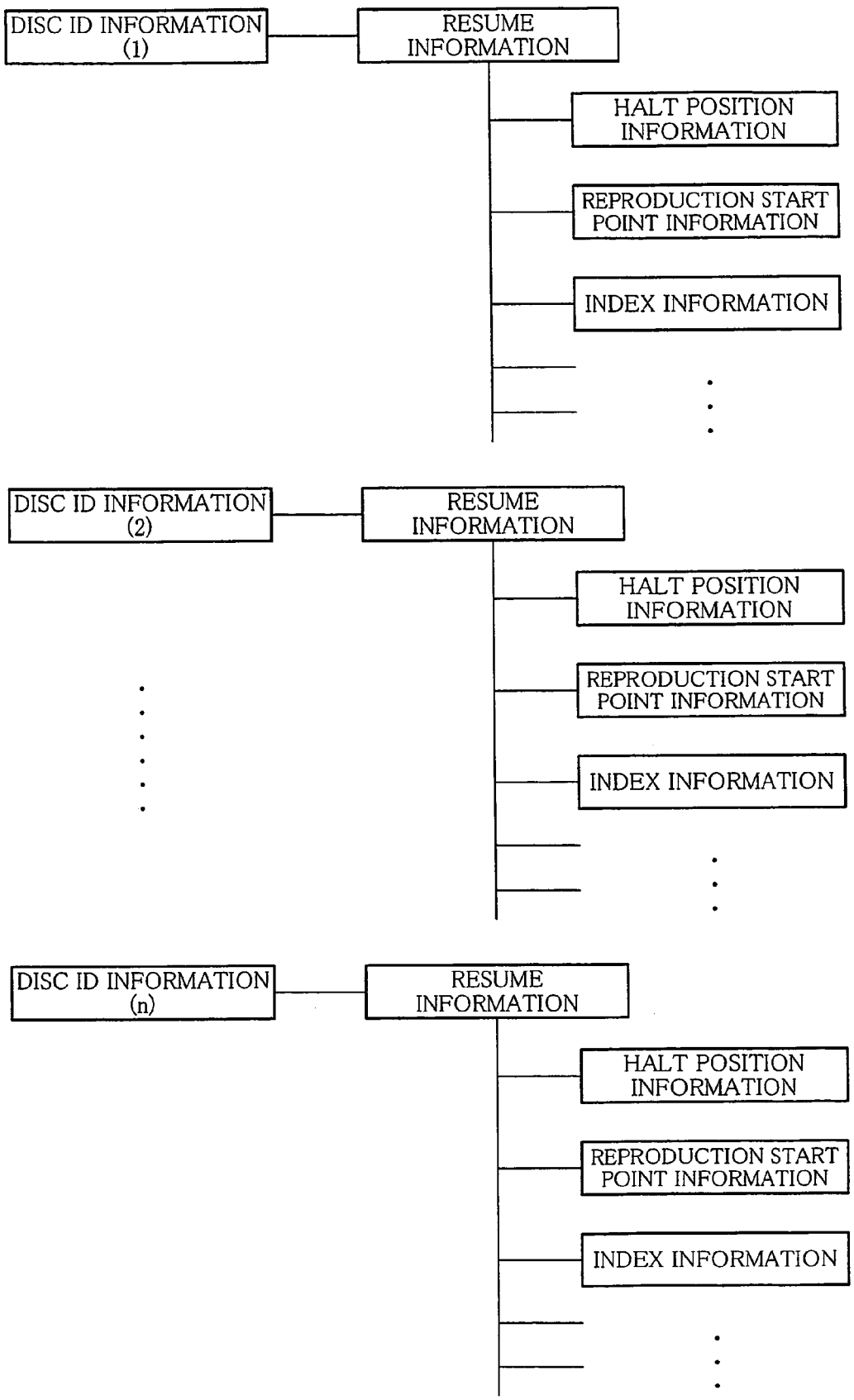
FIG. 12 is an explanatory diagram illustrating a structure of disc ID management table for managing a disc ID, halt position information, and reproduction point information, each of which is stored in a work memory of the recording/reproducing apparatus shown in FIG. 8.

Next, the following description explains the disc ID management table stored in the work memory 119 with reference to FIG. 12.

FIG. 12 illustrates an example of a structure of the disc ID management table that is stored in the work memory 119, and that manages the disc ID and the halt position information. The disc ID management table includes aggregates of n-number (n is an integer) of disc ID information, and is information indicating the aforementioned uniquely distinguishable disc IDs. The disc ID information is correlated with the halt position information.

In reference to the disc ID management table, the system control section 111 can resume reproduction of the optical disc 17 even in cases where the optical disc 17 is ejected and reinserted (reloaded). Moreover, because different reproduction start points, from which reproduction is resumed, can be designated for different media, the disc ID management table may be correlated with these sets of the information (sets of the reproduction start point information).

Note that it is also possible to realize (i) the aforementioned functions of the various means that the system control section 111 serves as, and (ii) the aforementioned control method carried out by the system control section 111, by causing a computer to execute a reproducing apparatus control program (reproducing program). Examples of the means include the memory content management means and the reproduction start control means.

In this case, the program code read out from the storage medium realizes the functions and the methods, and hence the storage medium that stores the program code is a component of the present invention.

The storage medium for supplying the program code can be so configured as to be detachable from the apparatus. Moreover, the storage medium may be a storage medium which holds the program code in a fixed manner. Moreover, the storage medium may be attached to the apparatus so that the computer can directly reads out the stored program code. Alternatively, the storage medium may be attached, as an external memory apparatus, to a program reading apparatus connected to a system or the apparatus so that the computer can read out the recorded program code via the program reading apparatus.

As described above, the present recording/reproducing apparatus for reproducing information stored in the exchangeable optical disc 17 includes: (i) the disc recording/reproducing section 115 for reproducing information of the optical disc 17; (ii) the disc ID recognition section 116 for recognizing the disc ID identifying the optical disc 17; (iii) the work memory 119 for storing various kinds of information including the disc ID; (iv) the reproduction start point calculation section 118 for calculating to determine the reproduction start point; and (v) the system control section 111.

When halting the reproduction of the optical disc 17, the system control section 111 causes the work memory 119 to store the disc ID management table in which the disc ID of the optical disc 17 and the reproduction halt position are correlated with each other. The disc ID has been recognized by the disc ID recognition section 116, and the reproduction halt position can locate a physical point (on the optical disc 17) so that a point from which next reproduction starts is determined (found) in accordance with the last reproduction halt point.

When starting to reproduce the optical disc 17, the system control section 111 controls the reproduction start point in accordance with the halt position information that is stored in the work memory 119 and that corresponds to the disc ID of the optical disc 17, which disc ID is recognized by the disc ID recognition section 116. The reproduction start point is a point from which the disc recording/reproducing section 115 starts the reproduction.

The reproduction start point is found (determined), by the reproduction start point calculation section 118, in accordance with the deviation amount from the designated reproduction halt position. The calculation result is sent to the system control section 111 as the reproduction start point, and then the reproduction starts.

With this, the reproducing apparatus of the present invention can set the reproduction start point at the point deviated, by the designated point, from the reproduction halt position. The reproduction start point can be set in this way as long as the reproducing apparatus has once reproduced the optical disc having the disc ID. In other words, the reproduction start point can be thus set in the following cases (1) through (3): (1) a case where the optical disc is reproduced and is never ejected from the reproducing apparatus before resuming the reproduction of the optical disc; (2) a case where the optical disc is reproduced and ejected, but is never exchanged, and is reinserted in the reproducing apparatus before resuming the reproduction of the optical disc; and (3) a case where the optical disc is reproduced and ejected, and other optical disc(s) are reproduced, and the optical disc (the initially inserted optical disc) is reinserted, before resuming the reproduction of the optical disc. Moreover, the setting of the reproduction start point is carried out in accordance with the halt position information that corresponds to the optical disc (the initially inserted optical disc) stored in the work memory 119.

Further, the viewer (user) can recognize the last reproduction halt position and the contents by temporally suspending the reproduction, having started from the reproduction start point, at the reproduction halt position.

Further, in the case where the reproducing apparatus is arranged such that the reproduction pauses (displays a still image) at the reproduction halt position, the user can recognize the last reproduction halt position with ease. Further, the reproducing apparatus is arranged such that the pause can be canceled and the reproduction can start again by a set timer or a user's reproduction instruction. In other words, the user can set pause time as required, and can resume the reproduction any time he/she needs to.

In the above description of the present embodiment, the recording/reproducing apparatus uses the optical disc 17 (disc-shaped storage medium) as the information storage medium; however, the present invention is not limited to such an exchangeable disc-shaped storage medium. Examples of the information storage medium include: semiconductor memories such as a memory stick, a SD (secure digital), and a compact flash; and a hard disk. Such information storage media also can hold (store) medium identification information (identification information) that is equivalent to the aforementioned disc ID, and that allows for an effect similar to the effect that the disc ID does.

In the present embodiment, time is basis (unit) for the user-designated deviation amount of the reproduction start designated point from the reproduction halt position. However, the designation of the deviation amount is not necessarily based on time. For example, the deviation amount may be designated by designating a beginning of a tune (based on a chapter, a tune, a certain-length silent interval as unit).

As described above, a reproducing apparatus, of the present invention, for reproducing information stored in an information storage medium, the reproducing apparatus includes: reproducing means for reproducing the information stored in the information storage medium; recognition means for recognizing identification information for identifying the information storage medium; memory means for storing information including the identification information; reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium.

With this arrangement, the recognition means can recognize the identification information of the information storage medium that is being reproduced by the reproducing means or that is to be reproduced by the reproducing means.

Moreover, when halting the reproduction of the information storage medium, the reproduction halt control means causes the memory means to store the identification information of the reproduced information storage medium and the halt position information such that the identification information and the halt position information are correlated with each other. The halt position information is able to indicate the physical point from which next reproduction of the information storage medium should be started so that next reproduction of the information storage medium starts from the halt position. Moreover, when starting the reproduction of the information storage medium, the reproduction start control means controls the reproduction point in accordance with the halt position information that is stored in the memory means and that is correlated with the identification information of the information storage medium to be reproduced.

This allows reproduction of the information storage medium to be resumed from the point, at which the last reproduction was halted, in the following cases (1) through (3): (1) a case where an information storage medium is not ejected from the reproducing apparatus, and is resumed; (2) a case where a first information storage medium is ejected from the reproducing apparatus, and is not exchanged with a second information storage medium, and is reinserted and resumed; and (3) a case where a first information storage medium is ejected from the reproducing apparatus, and a second information storage medium is inserted and reproduced, and the first information storage medium is reinserted and reproduced. In the cases (2) and (3), the resuming is carried out in accordance with the halt position information that corresponds to the first information storage medium and that is stored in the memory means.

As such, the above arrangement allows reproduction of the information storage medium to be resumed from the point where the last reproduction was halted, even in the cases where the information storage medium is ejected and reproduced again, and where the information storage medium is exchanged and reproduced again.

In addition to the arrangement of the reproducing apparatus, it is preferable that: when halting a reproduction of an information storage medium whose identification information is not recognizable by the recognition means, the reproduction halt control means sets identification information for the information storage medium, and causes the memory means to store (i) the identification information thus set and (ii) halt position information such that the identification information and the halt position information are correlated with each other; and when starting a reproduction of the information storage medium whose identification information is not recognizable by the recognition means, the reproduction start control means controls a reproduction start position in accordance with the halt position information that is correlated with the identification information, stored in the memory means, that has been set when halting the reproduction.

With the arrangement, the identification information is set for the information storage medium that is being reproduced or is to be reproduced by the reproducing means and that has no identification information recognizable by the recognition means (or that the recognition means recognizes that there is no disc ID), when halting the reproduction of information storage medium. The reproduction halt control means causes the memory means to store the identification information thus set and the halt position information in such a manner that they are correlated with each other. Moreover, when starting reproduction of the information storage medium, the reproduction start control means controls the reproduction point of the information storage medium, which is to be reproduced, in accordance with the halt position information that corresponds to the identification information being set and stored in the memory means. Thus, the control of the reproduction point is carried out even in the case where the information storage medium does not have identification information recognizable by the recognition means.

Therefore, the arrangement allows reproduction from the last reproduction halt position, in both the cases of (i) using the information storage medium having the recognizable identification information, and of (ii) using the information storage medium having no recognizable identification information. The identification information is recognized by the recognition means.

In addition to the arrangement of the reproducing apparatus, it is preferable that: the memory means is able to store (i) respective identification information of information storage media, and (ii) respective halt position information of the information storage media; and when starting a reproduction of an information storage medium, the reproduction start control means controls the reproduction means in accordance with halt position information of an information storage medium to be reproduced, among the halt position information of the information storage media stored in the memory means.

With this arrangement, the memory means can store sets of the identification information and sets of the halt position information of a plurality of information storage medium so that each identification information and each halt position information are correlated with each other. This allows realization of the resume function for each of the information storage mediums. Specifically, even when resuming reproduction of an information storage medium A after reproducing and halting another information storage medium B, the reproduction of the information storage medium A can be carried out from the halt position of the last reproduction of the information storage medium A.

In addition to the arrangement, it is preferable that: when halting a reproduction of an information storage medium, the reproduction halt control means causes the memory means to store information of a reproduction content read out from a position, which comes after a reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

With the arrangement, when the reproduction is halted, the memory means beforehand stores the information of the reproduction content after the halt position. On this account, when the reproduction is resumed, it is possible to simultaneously carry out the reproduction of the reproduction content from the memory means, and the initial process of the reproducing means. Examples of the initial process include: the laser adjustment; the various parameter settings; the readout of the TOC information of the information storage medium. Upon finishing the reproduction from the memory means, the reproduction from the information storage medium is carried out uninterruptedly. This shortens the latency time, and allows the user to uninterruptedly obtain the reproduced information. That is, this allows the user to enjoy the reproduction comfortably.

In addition to the arrangement of the reproducing apparatus, it is preferable that: when halting a reproduction of an information storage medium, the reproduction halt control means causes the memory means to store information of a reproduction content read out from a position, which comes before the reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

This arrangement allows the reproduction of the information to start from the point before the halt position by causing the memory means to store the information that corresponds to the point before the reproduction halt position when halting the reproduction. This allows the user to recall the content that corresponds to the point just before the reproduction halt position. Moreover, the content that corresponds to the point after the reproduction halt position can be uninterruptedly reproduced after reproducing the content that corresponds to the point before the reproduction halt position. Further, it is possible to simultaneously carry out the reproduction from the memory means, and the initial process of the reproducing means. This shortens the latency time, and allows the user to enjoy the reproduction comfortably.

In addition to the arrangement of the reproducing apparatus, it is preferable that the memory means is exchangeable.

With the arrangement, by exchanging the memory means, storage volume can be changed to store a larger amount of information that should be stored or to deal with a larger number of information storage mediums.

In addition to the arrangement of the reproducing apparatus, it is preferable that the reproduction halt control means causes the memory means to store the respective halt position information so that an order in which the respective halt position information have been recorded can be identified.

With the arrangement, when information stored in the memory means is required to be deleted, it is possible to delete the information in the order of recording (i.e. from the oldest one to the newest one).

In addition to the arrangement of the reproducing apparatus, it is preferable that memory content management means for preferentially deleting the information from an oldest one in the order recorded, when it is necessary to increase a free storage capacity in the memory means.

With this arrangement, when a larger free storage space is required in the memory means, the halt position information can be automatically deleted from the oldest one in the recorded order. This allows an increase of the free storage space in the memory means.

In addition to the arrangement of the reproducing apparatus, it is preferable that the reproducing apparatus further includes: display means for displaying contents of the information stored in the memory means; input means for receiving a user's input; and deactivating means for deactivating a reproduction from a halt position with respect to an information storage medium corresponding to specific identification information that is in accordance with a user's input.

The arrangement allows for a display of the information stored in the memory means. This allows the user to change a setting via the input means so that a normal reproduction of the information storage medium is carried out, when the information storage medium is not required to be reproduced from the halt position of the last reproduction. That is, the reproduction can be carried out depending on the user.

In addition to the arrangement of the reproducing apparatus, it is preferable that the reproducing apparatus further includes: display means for displaying contents of the information stored in the memory means; input means for receiving a user's input; and deleting means for deleting from the memory means halt position information corresponding to specific identification information that is in accordance with a user's input.

The arrangement allows for a display of the information stored in the memory means. This allows the user to manually delete unnecessary information stored in the memory means with the use of the input means.

In addition to the reproducing apparatus, it is preferable that: the input means allows the user to enter another name for each of the identification information, stored in the memory means, of an information storage media; the memory means stores the another name such that the another name is correlated with (i) identification information of the information storage medium and (ii) halt position information thereof, respectively; and the display means displays the another name stored in the memory means.

With the arrangement, the user can give a unique ID (recognizable name for the user), as another name, to any information storage medium including an information storage medium having no identification information. The unique ID can be stored in the memory means, and displayed by the display means. Therefore, by displaying the unique ID with the use of the display means, the user can carry out the operations of deactivating the reproduction from the halt position, and of deleting the information stored in the memory means. This allows for an improvement in accessibility to the various kinds of information stored in the information storage medium.

Especially in cases where the memory means stores respective sets of information of a plurality of information storage media, the user can recognize and select, in accordance with the recognizable name displayed by the display means, target information to be deleted or the like. This allows improvement of workability.

As described above, another reproducing apparatus of the present invention includes: recognition means for recognizing identification information identifying an information storage medium; memory means for storing identification information recognized by the recognition means; reproduction halt control means for causing the memory means to store the identification information and halt position information for identifying a reproduction halt position on the information storage medium such that the identification information and the halt position information are correlated with each other, when halting a reproduction of the information storage medium; and reproduction start position control means for determining, prior to a reproduction of the information storage medium and in accordance with the halt position information, a reproduction start position at a position which comes before the reproduction halt position, and for starting a reproduction from the reproduction start position.

With the above invention, the identification information of the loaded information storage medium is acquired by the recognition means, and the information storage medium is recognized (identified) and specified. Moreover, the identification information recognized by the recognition means is stored in the memory means.

When halting the reproduction of the information storage medium, the reproduction halt control means causes the memory means to store the halt position information such that the halt position information is correlated with the identification information. The halt position information indicates the point at which the reproduction of the information storage medium is halted. After that, the reproduction operation is halted.

When resuming the reproduction of the information storage medium after halting the reproduction of, e.g., a moving image contents, the reproduction start point control means sets, in accordance with the halt position information, the reproduction start point at a point before the reproduction halt position. Thereafter, the reproduction starts.

Note that the point before the halt position refers to (i) a point that corresponds to contents that has already been reproduced when the reproduction is halted (a point of time before the halt position), or (ii) a point that corresponds to the contents that has already been reproduced when the reproduction is halted, and that is physically away from the reproduction halt position by certain distance.

This allows reproduction of the information storage medium to resume from the point before the reproduction halt position, in the following cases (1) through (3): (1) a case where an information storage medium is not ejected from the reproducing apparatus, and is resumed; (2) a case where a first information storage medium is ejected from the reproducing apparatus, and is not exchanged with a second information storage medium, and is reinserted and resumed; and (3) a case where a first information storage medium is ejected from the reproducing apparatus, and a second information storage medium is loaded or loaded and reproduced, and the first information storage medium is reloaded and reproduced. In the cases (2) and (3), the resuming is carried out in accordance with the halt position information that corresponds to the first information storage medium.

With this, before resuming the reproduction from the reproduction halt position, the user can recall the content reproduced before the reproduction halt, and can sufficiently recognize the content. Further, with the above invention, the information storage medium that is being reproduced is correlated with the reproduction halt position. Therefore, sets of the reproduction halt position information of a plurality of information storage media can be stored in the memory means in such a manner that the information storage media are correlated with the sets of the reproduction halt position information, respectively. That is, irrespective of the reproduction halt positions and the information storage mediums, the reproduction of each information storage medium can be resumed so that the user can recall the content of each information storage medium. With this, no bothersome processes of pause, rewind, and the like are required unlike the conventional techniques.

In the reproducing apparatus, it is preferable that: the information storage medium contains a moving image, and the reproduction start position control means temporarily suspends the reproduction at the reproduction halt position, and displays a still image, and then restart a reproduction from the reproduction halt position.

In this case, the reproduction is carried out from (i) a former point to which the user has already seen, to (ii) the reproduction halt position. This allows easier recognition of the content of the reproduction contents. Further, because a still image is temporally displayed at the last reproduction halt position, the user can surely recognize the reproduction halt position, and can recognize the content very effectively.

It is preferable that the reproduction apparatus further includes timer means for measuring time of displaying the still image, and for setting time to be measured, wherein: the reproduction is restarted after the time thus set elapses, or the reproduction is restarted upon receipt of a reproduction instruction during displaying of the still image.

In the arrangement including the timer means, the reproduction restart process is automatically carried out after passing the time set in advance. This surely allows for reduction of user's operation. On the other hand, in cases where the reproduction restarts upon a reception of the reproduction instruction, the reproduction can be restarted any time the user wants to.

It is preferable that the reproducing apparatus further include: display means for displaying the identification information and the halt position information, each stored in the memory means; and input means for setting the reproduction start position, wherein: the reproduction start position control means starts a reproduction from the reproduction start position which has been set via the input means.

In this case, the display means displays, for each information storage medium, the identification information and the halt position information, each of these sets of information being obtained when starting the reproduction. Therefore, the user can check the information displayed by the display means, and can determine the reproduction start point via the input means.

For example, when reproducing moving image contents, the reproduction start point can be set at an appropriate point in accordance with the content. Meanwhile, when reproducing music contents contained in a CD (compact disc) or the like, the reproduction can be started from a beginning point or an end point of the tune. Moreover, the reproduction start point may be set at the reproduction halt position. As such, this allows the user to enjoy the reproduction comfortably.

A method, of the present invention, for reproducing information stored in the information storage medium includes the steps of: (a) instructing reproducing means to halt a reproduction of the information storage medium; (b) storing identification information and halt position information in memory means in such a manner that the identification information and the halt position information are correlated with each other, the identification information identifying the information storage medium, the halt position information indicative of a halt position from which the reproducing means should start reproducing of the information storage medium so that next reproduction starts from the halt position; the steps (a) and (b) being carried out when halting a reproduction of the information storage medium, (c) recognizing the identification information identifying the information storage medium; (d) acquiring halt position information that corresponds to the identification information recognized in the step (c), among plural halt position information stored in the memory means; and (e) controlling, in accordance with the halt position information acquired in the step (d), a reproduction start position from which the reproducing means starts a reproduction, the steps (c), (d), and (e) being carried out when starting of a reproduction of the information storage medium.

With the method, when halting the reproduction of the information storage medium in response to a reproduction halt instruction, the identification information and the halt position information of the information storage medium are stored. The halt position information is used so that next reproduction starts from the halt position. With this, when resuming the reproduction, the identification information is recognized, and the stored identification information and halt position information are used, whereby the reproduction operation can be carried out from the halt position.

To achieve the objects, a reproducing method of the present invention includes the steps of: (a) storing identification information and halt position information in such a manner that the identification information and the halt position information are correlated with each other, when halting reproduction of the information storage medium, the identification information identifying the information storage medium, the halt position information identifying a reproduction halt position on the information storage medium; and (b) recognizing the identification information of the information storage medium, and starting a reproduction from the reproduction start position that is determined according to the halt position information and that comes before the reproduction halt position, when starting of a reproduction of the information storage medium.

With the reproducing method, when halting the reproduction of the information storage medium, the reproduction operation is halted after storing the halt position information and the identification information such that they are correlated with each other. The halt position information indicates the reproduction halt position in the information storage medium, the identification information identifying the information storage medium.

When resuming the reproduction of the information storage medium after the reproduction halt, the identification information of the information storage medium is recognized, and the reproduction start point is determined, in accordance with the halt position information, at the point before the reproduction halt position, and the reproduction starts.

This allows reproduction of the information storage medium to resume from the point before the reproduction halt position, in the following cases (1) and (2): (1) a case where an information storage medium is not ejected from the reproducing apparatus, and is resumed; and (2) a case where a first information storage medium is ejected from the reproducing apparatus, and a second information storage medium is loaded or loaded and reproduced, and the first information storage medium is reloaded and reproduced. In the case (2), the resuming is carried out in accordance with the halt position information that corresponds to the first information storage medium.

With this, before resuming the reproduction after the reproduction halt position, the user can recall the content reproduced before the reproduction halt, and can sufficiently recognize the content.

Further, the information storage medium that is being reproduced is correlated with the reproduction halt position. Therefore, sets of the reproduction halt position information of a plurality of the information storage media can be stored in the memory means in such a manner that the information storage media are correlated with the sets of the reproduction halt position information, respectively.

That is, irrespective of the reproduction halt positions and the information storage mediums, the reproduction of each information storage medium can be resumed so that the user can recall the content of each information storage medium. With this, no bothersome processes of pause, rewind, and the like are required unlike the conventional techniques.

In the method, it is preferable that the reproduction start position is set with reference to the stored identification information and the halt position information which are displayed, and the reproduction starts from the reproduction start position thus set.

In this case, the display means displays, for each information storage medium, the identification information and the halt position information, each set of the information being obtained when starting the reproduction. Therefore, the user can check the information displayed by the display means, and can determine the reproduction start point via the input means.

For example, when reproducing moving image contents, the reproduction start point can be set at an appropriate point in accordance with the content. Meanwhile, when reproducing music contents contained in a CD (compact disc) or the like, the reproduction can be started from a beginning point or an end point of the tune. Moreover, the reproduction start point may be set at the reproduction halt position. As such, this allows the user to enjoy the reproduction comfortably.

A reproducing program, of the present invention, for executing the method of controlling the reproduction apparatus causes a computer to perform the steps.

With the arrangement, the control method can be executed by the computer as a reproduction program.

A computer-readable storage medium of the present invention contains the reproducing program, and has a structure allowing a computer to read the program therefrom.

With the arrangement, by causing an arbitrary computer to read the computer-readable storage medium containing the reproduction program, the reproduction method can be carried out.

With this, the reproduction program can be stored in the storage medium that is readable by a computer provided in the reproducing apparatus. Moreover, the storage medium allows easy storage and distribution of the reproduction program. Further, by causing the computer to read the storage medium, the computer can serve as the aforementioned means and can carry out the steps of the method for controlling the reproducing apparatus. Examples of the aforementioned means are: the memory content management means, the deactivating means, the deleting means, the reproduction halt control means, the reproduction start control means, the reproduction start point control means, and the reproduction control means.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

Even in cases where an information storage medium is ejected and reproduced again, or is exchanged and reproduced again, a reproducing apparatus of the present invention allows reproduction to start from a reproduction halt position of the last reproduction of the information storage medium, or to start from a point before the reproduction halt position. Therefore, the present invention is applicable to a reproducing apparatus for reproducing a disc medium or the like that has random accessibility, and to a reproducing method thereof.

The invention claimed is:

1. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

when halting a reproduction of an information storage medium whose identification information is not recognizable by the recognition means, the reproduction halt control means sets identification information for the information storage medium, and causes the memory means to store (i) the identification information thus set and (ii) halt position information such that the identification information and the halt position information are correlated with each other; and when starting a reproduction of the information storage medium whose identification information is not recognizable by the recognition means, the reproduction start control means controls a reproduction start position in accordance with the halt position information that is correlated with the identification information, stored in the memory means, that has been set when halting the reproduction.

2. The reproducing apparatus as set forth in claim 1, wherein:

the memory means is exchangeable.

3. The reproducing apparatus as set forth in claim 1, wherein:

the reproduction halt control means causes the memory means to store the respective halt position information so that an order in which the respective halt position information have been recorded can be identified.

4. The reproducing apparatus as set forth in claim 3, further comprising:

memory content management means for preferentially deleting the information from an oldest one in the order recorded, when it is necessary to increase a free storage capacity in the memory means.

5. The reproducing apparatus as set forth in claim 1, further comprising:

display means for displaying contents of the information stored in the memory means;

input means for receiving a user's input; and deactivating means for deactivating a reproduction from a halt position with respect to an information storage medium corresponding to specific identification information that is in accordance with a user's input.

6. The reproducing apparatus as set forth in claim 5, wherein:

the input means allows the user to enter another name for each of the identification information, stored in the memory means, of an information storage media;

the memory means stores said another name such that said another name is correlated with (i) identification information of the information storage medium and (ii) halt position information thereof, respectively; and the display means displays said another name stored in the memory means.

7. The reproducing apparatus as set forth in claim 1, further comprising:

display means for displaying contents of the information stored in the memory means;

input means for receiving a user's input; and deleting means for deleting from the memory means halt position information corresponding to specific identification information that is in accordance with a user's input.

8. The reproducing apparatus as set forth in claim 7, wherein:

the input means allows the user to enter another name for each of the identification information, stored in the memory means, of an information storage media;

the memory means stores said another name such that said another name is correlated with (i) identification information of the information storage medium and (ii) halt position information thereof, respectively; and the display means displays said another name stored in the memory means.

9. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

when halting a reproduction of an information storage medium, the reproduction halt control means causes the memory means to store information of a reproduction content read out from a position, which comes after a reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

10. The reproducing apparatus as set forth in claim 9, wherein:

the memory means is exchangeable.

11. The reproducing apparatus as set forth in claim 9, wherein:

the reproduction halt control means causes the memory means to store the respective halt position information so that an order in which the respective halt position information have been recorded can be identified.

12. The reproducing apparatus as set forth in claim 9, further comprising:

display means for displaying contents of the information stored in the memory means;

input means for receiving a user's input; and deactivating means for deactivating a reproduction from a halt position with respect to an information storage medium corresponding to specific identification information that is in accordance with a user's input.

13. The reproducing apparatus as set forth in claim 9, further comprising:

display means for displaying contents of the information stored in the memory means;

input means for receiving a user's input; and deleting means for deleting from the memory means halt position information corresponding to specific identification information that is in accordance with a user's input.

14. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

when halting a reproduction of an information storage medium, the reproduction halt control means causes the memory means to store information of a reproduction content read out from a position, which comes before the reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

15. The reproducing apparatus as set forth in claim 14, wherein:
the memory means is exchangeable.

16. The reproducing apparatus as set forth in claim 14, wherein:
the reproduction halt control means causes the memory means to store the respective halt position information so that an order in which the respective halt position information have been recorded can be identified.

17. The reproducing apparatus as set forth in claim 14, further comprising:
display means for displaying contents of the information stored in the memory means;
input means for receiving a user's input; and
deactivating means for deactivating a reproduction from a halt position with respect to an information storage medium corresponding to specific identification information that is in accordance with a user's input.

18. The reproducing apparatus as set forth in claim 14, further comprising:
display means for displaying contents of the information stored in the memory means;
input means for receiving a user's input; and
deleting means for deleting from the memory means halt position information corresponding to specific identification information that is in accordance with a user's input.

19. A reproducing apparatus, comprising:
recognition means for recognizing identification information identifying an information storage medium;
memory means for storing identification information recognized by the recognition means;
reproduction halt control means for causing the memory means to store the identification information and halt position information for identifying a reproduction halt position on the information storage medium such that the identification information and the halt position information are correlated with each other, when halting a reproduction of the information storage medium; and
reproduction start position control means for determining, prior to a reproduction of the information storage medium and in accordance with the halt position information, a reproduction start position at a position which comes before the reproduction halt position, and for starting a reproduction from the reproduction start position.

20. The reproducing apparatus as set forth in claim 19, wherein:
the information storage medium contains a moving image, and
the reproduction start position control means temporarily suspends the reproduction at the reproduction halt position, and displays a still image, and then restart a reproduction from the reproduction halt position.

21. The reproducing apparatus as set forth in claim 20, further comprising:
timer means for measuring time of displaying the still image, and for setting time to be measured,
wherein:
the reproduction is restarted after the time thus set elapses, or the reproduction is restarted upon receipt of a reproduction instruction during displaying of the still image.

22. The reproducing apparatus as set forth claim 19, further comprising:
display means for displaying the identification information and the halt position information, each stored in the memory means; and
input means for setting the reproduction start position,
wherein:
the reproduction start position control means starts a reproduction from the reproduction start position which has been set via the input means.

23. A reproducing method, comprising the steps of:
storing identification information and halt position information in such a manner that the identification information and the halt position information are correlated with each other, when halting reproduction of the information storage medium, the identification information identifying the information storage medium, the halt position information identifying a reproduction halt position on the information storage medium; and
recognizing the identification information of the information storage medium and starting a reproduction from the reproduction start position that is determined according to the halt position information and that comes before the reproduction halt position, when starting of a reproduction of the information storage medium.

24. The method as set forth in claim 23, wherein:
the reproduction start position is set with reference to the stored identification information and the halt position information which are displayed, and the reproduction starts from the reproduction start position thus set.

25. A reproducing method, comprising the steps of:
storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;
recognizing identification information that identifies an information storage medium to be reproduced, when starting a reproduction of the information storage medium;
identifying a reproduction start position in accordance with halt position information, which corresponds to the identification information that has been recognized, among sets of halt position information, and starting a reproduction from the reproduction start position;
setting identification information for an information storage medium whose identification information is not recognizable, and storing the identification information thus set and the halt position information in such a manner that the identification information and the halt position are correlated with each other, the setting and the storing being carried out when halting a reproduction of the information storage medium; and
identifying the reproduction start position according to the halt position information that corresponds to the identification information that has been set and stored, when starting the reproduction of the information storage medium.

26. A reproducing method, comprising the steps of:
storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;

recognizing identification information that identifies an information storage medium to be reproduced, when starting a reproduction of the information storage medium;

identifying a reproduction start position in accordance with halt position information, which corresponds to the identification information that has been recognized, among sets of halt position information, and starting a reproduction from the reproduction start position;

storing the identification information of an information storage medium and information of reproduction content read out from a position, which comes after the reproduction halt position, of the information storage medium in such a manner that the identification information and the readout information are correlated with each other, the storing being carried out when halting a reproduction of the information storage medium; and reproducing the reproduction content so that it is correlated with the identification information of the information storage medium, and consecutively reproduces the information storage medium, when starting a reproduction of the information storage medium.

27. A reproducing method, comprising the steps of:

storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;

recognizing identification information that identifies an information storage medium to be reproduced, when starting a reproduction of the information storage medium;

identifying a reproduction start position in accordance with halt position information, which corresponds to the identification information that has been recognized, among sets of halt position information, and starting a reproduction from the reproduction start position;

storing the identification information of an information storage medium and information of reproduction content read out from a position, which comes before the reproduction halt position, of the information storage medium in such a manner that the identification information and the readout information are correlated with each other, the storing being carried out when halting a reproduction of the information storage medium; and reproducing the reproduction content so that it is correlated with the identification information of the information storage medium, and consecutively reproduces the information storage medium, when starting a reproduction of the information storage medium.

28. A computer-readable storage medium having recorded thereon a program for causing a computer to function as a reproducing apparatus for performing a reproducing method comprising the steps of:

storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;

recognizing identification information that identifies an information storage medium to be reproduced, when starting a reproduction of the information storage medium;

identifying a reproduction start position in accordance with halt position information, which corresponds to the identification information that has been recognized, among sets of halt position information, and starting a reproduction from the reproduction start position;

setting identification information for an information storage medium whose identification information is not recognizable, and storing the identification information thus set and the halt position information in such a manner that the identification information and the halt position are correlated with each other, the setting and the storing being carried out when halting a reproduction of the information storage medium; and identifying the reproduction start position according to the halt position information that corresponds to the identification information that has been set and stored, when starting the reproduction of the information storage medium.

29. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

when halting a reproduction of an information storage medium whose identification information is not recognizable by the recognition means, the reproduction halt control means sets identification information for the information storage medium, and causes the memory means to store (i) the identification information thus set and (ii) halt position information such that the identification information and the halt position information are correlated with each other; and when starting a reproduction of the information storage medium whose identification information is not recognizable by the recognition means, the reproduction start control means controls a reproduction start position in accordance with the halt position information that is correlated with the identification information, stored in the memory means, that has been set when halting the reproduction; and wherein:
when halting a reproduction of an information storage medium, the reproduction halt control means causes the memory means to store information of a reproduction content read out from a position, which comes after a reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

30. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:
the memory means is able to store (i) respective identification information of information storage media, and (ii) respective halt position information of the information storage media; and when starting a reproduction of an information storage medium, the reproduction start control means controls the reproducing means in accordance with halt position information of an information storage medium to be reproduced, among the halt position information of the information storage media stored in the memory means; and wherein:
when halting a reproduction of an information storage medium, the reproduction halt control means causes the memory means to store information of a reproduction content read out from a position, which comes after a reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

31. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:
when halting a reproduction of an information storage medium whose identification information is not recognizable by the recognition means, the reproduction halt control means sets identification information for the information storage medium, and causes the memory means to store (i) the identification information thus set and (ii) halt position information such that the identification information and the halt position information are correlated with each other; and when starting a reproduction of the information storage medium whose identification information is not recognizable by the recognition means, the reproduction start control means controls a reproduction start position in accordance with the halt position information that is correlated with the identification information, stored in the memory means, that has been set when halting the reproduction;

wherein:
the memory means is able to store (i) respective identification information of information storage media, and (ii) respective halt position information of the information storage media; and when starting a reproduction of an information storage medium, the reproduction start control means controls the reproducing means in accordance with halt position information of an information storage medium to be reproduced, among the halt position information of the information storage media stored in the memory means; and wherein:

when halting a reproduction of an information storage medium, the reproduction halt control means causes the memory means to store information of a reproduction content read out from a position, which comes after a reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

32. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

when halting a reproduction of an information storage medium whose identification information is not recognizable by the recognition means, the reproduction halt control means sets identification information for the information storage medium, and causes the memory means to store (i) the identification information thus set and (ii) halt position information such that the identification information and the halt position information are correlated with each other; and when starting a reproduction of the information storage medium whose identification information is not recognizable by the recognition means, the reproduction start control means controls a reproduction start position in accordance with the halt position information that is correlated with the identification information, stored in the memory means, that has been set when halting the reproduction; and wherein:

when halting a reproduction of an information storage medium, the reproduction halt control means causes the memory means to store information of a reproduction content read out from a position, which comes before the reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

33. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

the memory means is able to store (i) respective identification information of information storage media, and (ii) respective halt position information of the information storage media; and when starting a reproduction of an information storage medium, the reproduction start control means controls the reproducing means in accordance with halt position information of an information storage medium to be reproduced, among the halt position information of the information storage media stored in the memory means; and when halting a reproduction of an information storage medium, the reproduction halt control means causes the memory means to store information of a reproduction content read out from a position, which comes before the reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

34. A reproducing apparatus for reproducing information stored in an information storage medium, the reproducing apparatus comprising:

reproducing means for reproducing the information stored in the information storage medium;

recognition means for recognizing identification information for identifying the information storage medium;

memory means for storing information including the identification information;

reproduction halt control means for causing the memory means to store, when halting a reproduction of an information storage medium, (i) identification information of the information storage medium, which identification information has been recognized by the recognition means, and (ii) halt position information such that the identification information and the halt position information are correlated with each other, the halt position information identifying a halt position on the information storage medium, from which halt position the reproducing means starts a reproduction of the information storage medium so that a next reproduction of the information storage medium starts from the halt position; and reproduction start control means for controlling a reproduction start position in accordance with the halt position information stored in the memory means, when starting a reproduction of the information storage medium;

wherein:

when halting a reproduction of an information storage medium whose identification information is not recognizable by the recognition means, the reproduction halt control means sets identification information for the information storage medium, and causes the memory means to store (i) the identification information thus set and (ii) halt position information such that the identification information and the halt position information are correlated with each other; and when starting a reproduction of the information storage medium whose identification information is not recognizable by the recognition means, the reproduction start control means controls a reproduction start position in accordance with the halt position information that is correlated with the identification information, stored in the memory means, that has been set when halting the reproduction;

wherein:

the memory means is able to store (i) respective identification information of information storage media, and (ii) respective halt position information of the information storage media; and when starting a reproduction of an information storage medium, the reproduction start control means controls the reproducing means in accordance with halt position information of an information storage medium to be reproduced, among the halt position information of the information storage media stored in the memory means; and when halting a reproduction of an information storage medium, the reproduction halt control means causes the memory means to store information of a reproduction content read out from a position, which comes before the reproduction halt position, of the information storage medium such that the information of the reproduction content is correlated with identification information of the information storage medium; and when starting a reproduction of the information storage medium, the reproduction start control means reproduces the reproduction content which has been stored in the memory means so as to be correlated with the identification information of the information storage medium, and consecutively reproduces the information storage medium.

35. A reproducing method, comprising the steps of:

storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;

recognizing identification information that identifies an information storage medium to be reproduced, when starting a reproduction of the information storage medium;

identifying a reproduction start position in accordance with halt position information, which corresponds to the identification information that has been recognized, among sets of halt position information, and starting a reproduction from the reproduction start position;

setting identification information for an information storage medium whose identification information is not recognizable, and storing the identification information thus set and the halt position information in such a manner that the identification information and the halt position are correlated with each other, the setting and the storing being carried out when halting a reproduction of the information storage medium;

identifying the reproduction start position according to the halt position information that corresponds to the identification information that has been set and stored, when starting the reproduction of the information storage medium;

storing the identification information of an information storage medium and information of reproduction content read out from a position, which comes after the reproduction halt position, of the information storage medium in such a manner that the identification information and the readout information are correlated with each other, the storing being carried out when halting a reproduction of the information storage medium; and reproducing the reproduction content so that it is correlated with the identification information of the information storage medium, and consecutively reproduces the information storage medium, when starting a reproduction of the information storage medium.

36. A reproducing method, comprising the steps of:
storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;
recognizing identification information that identifies an information storage medium to be reproduced, when starting a reproduction of the information storage medium;
identifying a reproduction start position in accordance with halt position information, which corresponds to the identification information that has been recognized, among sets of halt position information, and starting a reproduction from the reproduction start position;
setting identification information for an information storage medium whose identification information is not recognizable, and storing the identification information thus set and the halt position information in such a manner that the identification information and the halt position are correlated with each other, the setting and the storing being carried out when halting a reproduction of the information storage medium;
identifying the reproduction start position according to the halt position information that corresponds to the identification information that has been set and stored, when starting the reproduction of the information storage medium;
storing the identification information of an information storage medium and information of reproduction content read out from a position, which comes before the reproduction halt position, of the information storage medium in such a manner that the identification information and the readout information are correlated with each other, the storing being carried out when halting a reproduction of the information storage medium; and
reproducing the reproduction content so that it is correlated with the identification information of the information storage medium, and consecutively reproduces the information storage medium, when starting a reproduction of the information storage medium.

37. A computer-readable storage medium having recorded thereon a program for causing a computer to function as a reproducing apparatus for performing a reproducing method comprising the steps of:
storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;
recognizing identification information that identifies an information storage medium to be reproduced, when starting a reproduction of the information storage medium;
identifying a reproduction start position in accordance with halt position information, which corresponds to the identification information that has been recognized, among sets of halt position information, and starting a reproduction from the reproduction start position;
storing the identification information of an information storage medium and information of reproduction content read out from a position, which comes after the reproduction halt position, of the information storage medium in such a manner that the identification information and the readout information are correlated with each other, the storing being carried out when halting a reproduction of the information storage medium; and
reproducing the reproduction content so that it is correlated with the identification information of the information storage medium, and consecutively reproduces the information storage medium, when starting a reproduction of the information storage medium.

38. A computer-readable storage medium having recorded thereon a program for causing a computer to function as a reproducing apparatus for performing a reproducing method comprising the steps of:
storing identification information and halt position information in such a manner that the identification information and the halt position information are correlated with each other, when halting a reproduction of an information storage medium, the identification information identifying the information storage medium, the halt position information identifying a reproduction halt position from which a next reproduction of the information storage medium starts;
recognizing identification information that identifies an information storage medium to be reproduced, when starting a reproduction of the information storage medium;
identifying a reproduction start position in accordance with halt position information, which corresponds to the identification information that has been recognized, among sets of halt position information, and starting a reproduction from the reproduction start position;
storing the identification information of an information storage medium and information of reproduction content read out from a position, which comes before the reproduction halt position, of the information storage medium in such a manner that the identification information and the readout information are correlated with each other, the storing being carried out when halting a reproduction of the information storage medium; and
reproducing the reproduction content so that it is correlated with the identification information of the information storage medium, and consecutively reproduces the information storage medium, when starting a reproduction of the information storage medium.

* * * * *